US008652370B2

(12) United States Patent
Fujikawa et al.

(10) Patent No.: US 8,652,370 B2

(45) Date of Patent: Feb. 18, 2014

(54) HOT ISOSTATIC PRESSING METHOD AND APPARATUS

(75) Inventors: Takao Fujikawa, Takasago (JP); Tomomitsu Nakai, Takasago (JP); Makoto Yoneda, Takasago (JP); Shigeo Kofune, Takasago (JP); Yoshihiko Sakashita, Takasago (JP); Masahiko Mitsuda, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 936 days.

(21) Appl. No.: 11/671,109

(22) Filed: Feb. 5, 2007

(65) Prior Publication Data

US 2007/0228596 A1 Oct. 4, 2007

(30) Foreign Application Priority Data

Mar. 28, 2006 (JP) ................................ 2006-088938

(51) Int. Cl.

*B29C 39/04* (2006.01)

*B28B 7/32* (2006.01)

(52) U.S. Cl.

USPC ............................................ 264/85; 264/314

(58) Field of Classification Search

USPC .................................................... 264/85, 314

See application file for complete search history.

(56) References Cited

U.S. PATENT DOCUMENTS

| | | | | |
|---|---|---|---|---|
| 3,562,371 | A * | 2/1971 | Bush | 264/664 |
| 3,869,233 | A * | 3/1975 | Witkin | 425/78 |
| 4,217,087 | A | 8/1980 | Bowles | |
| 4,359,336 | A * | 11/1982 | Bowles | 419/49 |
| 5,118,289 | A * | 6/1992 | Bergman et al. | 432/205 |
| 6,056,857 | A * | 5/2000 | Hunt et al. | 204/192.15 |
| 6,073,346 | A * | 6/2000 | Runkle | 29/894.01 |
| 6,250,907 | B1 | 6/2001 | Bergman | |
| 6,640,556 | B2 * | 11/2003 | Ursan et al. | 62/50.6 |

FOREIGN PATENT DOCUMENTS

| | | |
|---|---|---|
| JP | 3-34638 | 7/1991 |
| KR | 96-013891 | 10/1996 |
| KR | 2003-0093108 | 12/2003 |

OTHER PUBLICATIONS

H.V Atkinson et al., "Fundamental Aspects of Hot Isostatic Pressing: An Overview", Metallurgical and Materials Transactions A, vol. 31A (Dec. 2000) pp. 2981-3000.*

U.S. Appl. No. 12/917,922, filed Nov. 2, 2010, Nakai, et al.

* cited by examiner

*Primary Examiner* — Jessee Roe

(74) *Attorney, Agent, or Firm* — Oblon, Spivak, McClelland, Maier & Neustadt, L.L.P.

(57) ABSTRACT

A hot isostatic pressing method is disclosed wherein workpieces are accommodated within a high pressure vessel and the interior of the high pressure vessel is filled with an inert gas of a high temperature and a high pressure to treat the workpieces. The method includes a cooling step which is performed after maintaining the interior of the high pressure vessel at a high temperature and a high pressure for a predetermined time and in which a liquid inert gas is fed into the high pressure vessel. According to this method it is possible to shorten the cycle time of an HIP apparatus.

9 Claims, 18 Drawing Sheets

REVERSE ROTATION OF BLADES

NORMAL ROTATION OF BLADES

HOT ISOSTATIC PRESSING METHOD AND APPARATUS

BACKGROUND OF THE INVENTION

1. Field of the Invention

The present invention relates to a hot isostatic pressing method and a hot isostatic pressing apparatus for, for example, diffusion bonding of different materials in an inert gas atmosphere held at a high temperature and a high pressure.

2. Description of the Related Art

The hot isostatic pressing method (hereinafter may be referred to as "HIP method") has proved to be effective in improving mechanical properties, diminishing variations in properties and improving the yield and is in wide industrial use as a technique wherein a workpiece is treated at a high temperature of not lower than its recrystallization temperature in a high pressure gas atmosphere of several 10 to several 100 MPa to eliminate pores remaining in a cast product or a sintered product such as a ceramic product.

A conventional hot isostatic pressing apparatus (hereinafter may be referred to as "HIP apparatus") used for the aforesaid purpose has such a structure as shown in FIG. 18 wherein an electric furnace of a resistance wire heating type is accommodated in the interior of a vertical, cylindrical high pressure vessel 101. In the interior of the high pressure vessel, heaters 102 of a resistance wire heating type are disposed vertically in plural stages so as to surround a treatment chamber. This is for the following reason. A temperature distribution such that an upper portion is high in temperature and a lower portion is low in temperature is apt to occur due to a vigorous natural convection of a high pressure gas and therefore an isothermal condition is to be ensured by heating throughout the whole in the vertical direction. Further, a natural convection of gas can contribute to the phenomenon that the heat for heating and raising the temperature of a treatment chamber 103 is dissipated too much to the exterior of the system. In order that such a phenomenon can be suppressed efficiently, a structure of the treatment chamber 103 and the heaters 102 being enclosed by a bottomed cylindrical heat insulating structure 104 is popular as an optimum method. The heat having passed through the heat insulating structure 104 and transferred to the high pressure vessel 101 is removed by cooling water flowing in a water-cooling jacket portion 105.

According to the ordinary treatment performed in the HIP method, first evacuation and gas purging are firstly performed for removing air from the interior of the HIP apparatus, followed by raising the temperature and pressure, secondly holding the temperature and pressure in predetermined conditions and finally decreasing the temperature and pressure for taking out the treated product. In the HIP method, the cycle time required for all of these steps is long, so that the treatment capacity of the high pressure vessel which is expensive is deteriorated, resulting in increase of the treatment cost. Thus, shortening of the cycle time has been an important subject in industrial production in order to attain a wide spread of the HIP method.

Particularly, in the cycle time, the proportion of the time required for the cooling step is long because cooling is slow and this point poses a problem. A rapid cooling technique as a technique for remedying this drawback has made a rapid progress and at present there generally is performed rapid cooling in an HIP apparatus having a treatment chamber exceeding 1 m in diameter.

As rapid cooling methods there have been proposed a method which utilizes a natural convection created by a difference in gas density (U.S. Pat. No. 4,217,087) and a method wherein a fan or a pump are installed in the interior of a high pressure vessel to produce a forced convection in addition to the natural convection of gas (Japanese Utility Model Publication No. Hei 3-34638).

In these methods, however, there is a fear that in the interior of the treatment chamber the upper side may become higher in temperature, resulting in easy occurrence of a temperature distribution. In an effort to solve this problem there has been proposed a method wherein two fans capable of being controlled each independently are provided, thereby permitting soaking in the interior of the treatment chamber and cooling speed control to be done each independently (U.S. Pat. No. 6,250,907).

SUMMARY OF THE INVENTION

Generally, for increasing the cooling speed, it is necessary to increase the quantity of heat removed. In an HIP apparatus, water is used as a cooling medium and, as described in the foregoing three related art documents, there usually is adopted a method wherein cooling water is introduced into a water-cooling jacket mounted to an outer surface of a pressure-resisting cylinder and heat is dissipated through the pressure-resisting cylinder. However, the quantity of heat removed is substantially proportional to the difference between the temperature of an object to be cooled and the cooling water temperature, and when the internal temperature of the treatment chamber drops, the quantity of heat removed by cooling water decreases rapidly. Therefore, also in such methods as described in the foregoing three related art documents, in order to prevent the cycle time in the HIP apparatus from becoming long, there sometimes is a case where it is necessary to take out a workpiece from the HIP apparatus before being cooled completely and cool it for several hours in the air. This problem remains to be solved.

The present invention has been accomplished in view of the above-mentioned problem and it is an object of the present invention to provide a hot isostatic pressing method and an apparatus capable of shortening the cycle time in the HIP apparatus.

For achieving the above-mentioned object the present invention adopts the following technical means.

A hot isostatic pressing method according to the present invention comprises accommodating a workpiece in the interior of a high pressure vessel and filling the interior of the high pressure vessel with a high temperature, high pressure gas to treat the workpiece, wherein a cooling step performed after maintaining the interior of the high pressure vessel at a high temperature and a high pressure for a predetermined time includes a step of supplying liquefied gas into the high pressure vessel.

Preferably, the gas is an inert gas.

Preferably, the gas and the liquefied gas are the same substance.

Preferably, the cooling step includes a first step of cooling the workpiece without supplying the liquefied gas into the high pressure vessel and a second step of cooling the workpiece while supplying the liquefied gas into the high pressure vessel after the first step.

Preferably, in the cooling step, a fan provided in the interior of the high pressure vessel is rotated to agitate the inert gas present within the high pressure vessel.

Preferably, the supply of the liquefied gas into the high pressure vessel is performed using a cryogenic pump.

A hot isostatic pressing apparatus according to the present invention comprises a high pressure vessel for accommodating a workpiece therein and treating the workpiece with use of a high temperature, high pressure gas, gas supply means for supplying the gas into the high pressure vessel, and liquefied gas supply means for supplying liquefied gas into the high pressure vessel.

Preferably, a passage for supplying the gas into the high pressure vessel and a passage for supplying the liquefied gas into the high pressure vessel are separate from each other.

Preferably, a fan is provided within the high pressure vessel.

Preferably, the high pressure vessel includes an isolation chamber-forming member accommodated within the high pressure vessel in such a manner that an outer surface thereof is spaced from an inner surface of the high pressure vessel and a treatment chamber-forming member accommodated within the isolation chamber-forming member in such a manner that an outer surface thereof is spaced from an inner surface of the isolation chamber-forming member, the isolation chamber-forming member being open at one of upper and lower ends thereof, or a passage for communication between the interior and the exterior of the isolation chamber-forming member being formed in the one end, and a passage for communication between the interior and the exterior of the isolation chamber-forming member and a valve for opening and closing the passage being provided in the other end, the treatment chamber-forming member being open at one of upper and lower ends thereof, or a passage for communication between the interior and the exterior of the treatment chamber-forming member being formed in the one end, and the fan is provided in the other end for ventilation.

Alternatively and preferably, the high pressure vessel includes an isolation chamber-forming member accommodated within the high pressure vessel in such a manner that an outer surface thereof is spaced from an inner surface of the high pressure vessel and a treatment chamber-forming member accommodated within the isolation chamber-forming member in such a manner that an outer surface thereof is spaced from an inner surface of the isolation chamber-forming member, the isolation chamber-forming member being open at one of upper and lower ends thereof, or a passage for communication between the interior and the exterior of the isolation chamber-forming member being formed in the one end, and a cooling fan being provided in the other end, the cooling fan being configured so that a flow direction is reversed by forward-reverse switching of a rotational direction of the fan, the treatment chamber-forming member being open at one of upper and lower ends thereof, or a passage for communication between the interior and the exterior of the treatment chamber-forming member being formed in the one end, and the fan is provided in the other end for ventilation.

Preferably, the fan and the cooling fan are configured so that respective rotations can be controlled each independently.

Preferably, the liquefied gas supply means is a cryogenic pump.

According to the present invention it is possible to provide a hot isostatic pressing method and an apparatus capable of shortening the cycle time in the apparatus.

DETAILED DESCRIPTION OF THE PREFERRED EMBODIMENTS

Figure 1:
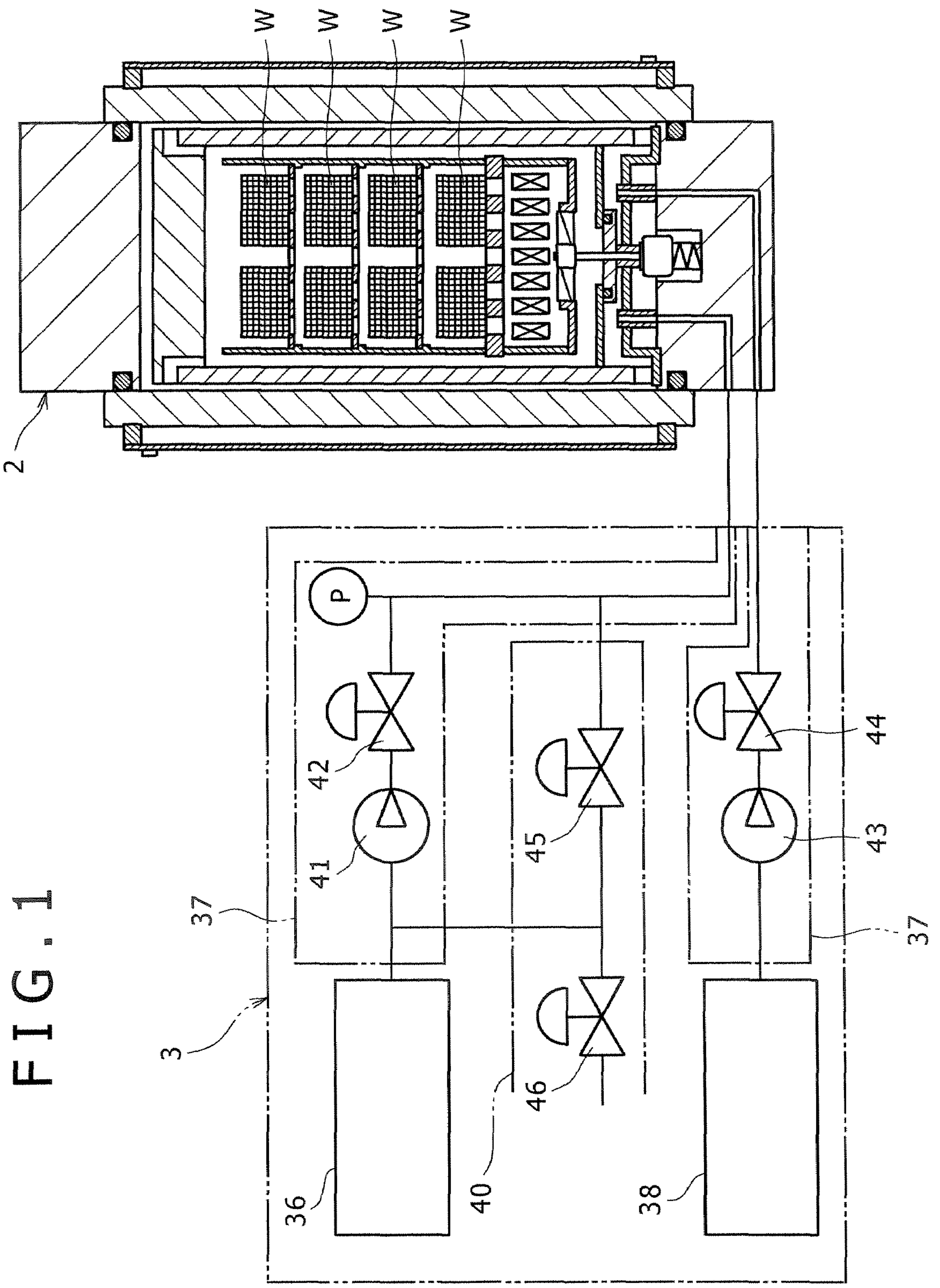
FIG. 1 is a schematic diagram of a hot isostatic pressing apparatus embodying the present invention.
Figure 2:
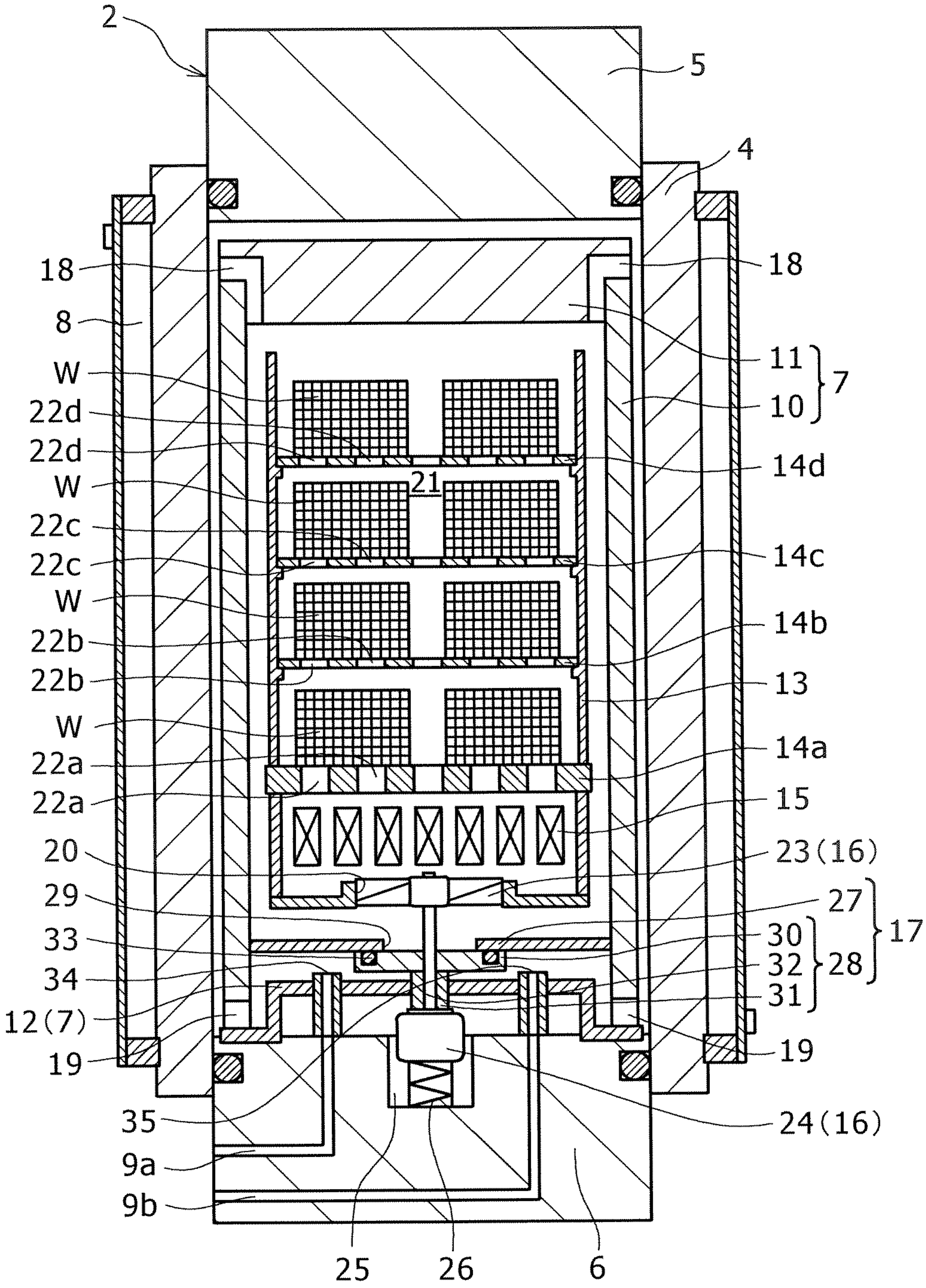
FIG. 2 is a sectional front view of a high pressure vessel.

FIG. 1 is a schematic diagram of a hot isostatic pressing apparatus 1 (hereinafter may be referred to as "HIP apparatus") embodying the present invention and FIG. 2 is a sectional front view of a high pressure vessel 2.

In FIG. 1, the hot isostatic pressing apparatus 1 comprises the high pressure vessel 2 and an inert medium supply system 3.

Referring to FIG. 2, the high pressure vessel 2 comprises a pressure-resisting cylinder 4, an upper lid 5, a lower lid 6 and a heat insulating structure 7.

An upper end of the pressure-resisting cylinder 4 is closed with the upper lid 5 and a lower end thereof is closed with the lower lid 6. The pressure-resisting cylinder 4, together with the upper and lower lids, constitutes a pressure-resisting vessel capable of withstanding a pressure of not lower than 1000 MPa. A jacket 8 for the flow of cooling water is provided on the outer periphery of the pressure-resisting cylinder 4. Two separate communication passages 9*a* and 9*b* for communication between the exterior and the interior of the high pressure vessel 2 are formed in the interior of the lower lid 6.

The heat insulating structure 7 comprises a structure body 10 and a lid 11.

In FIG. 2, the structure body 10 is a cylinder having an outside diameter smaller than the inside diameter of the pressure-resisting cylinder 4 and an upper end thereof is integral with the lid 11. Plural upper gas passages 18 for communication between the interior and the exterior of the structure body 10 are formed in the mating portion between the structure body 10 and the lid 11. Lower gas passages 19 for communication between the interior and the exterior of the structure body 10 are formed in the mating portion between the structure body 10 and the lower lid cover 12. The structure body 10 is placed on the high pressure vessel 2 through the lower lid cover 12.

The flow uniforming cylinder 13 has an outside diameter smaller than the inside diameter of the structure body 10 and is received inside the structure body 10 in such a manner that an upper end thereof defines gap between itself and an inner surface of the lid 11. The upper end of the flow uniforming cylinder 13 is open and a lower end thereof is closed. A generally circular fan hole 20 is formed at the center of the closed lower end of the flow uniforming cylinder 13. The flow uniforming cylinder 13 is provided in the interior thereof with four shelf plates 14*a* to 14*d* arranged at approximately equal spacings from the lower end of the flow uniforming cylinder and each disposed horizontally. The shelf plates 14*a* to 14*d* are for placing thereon workpieces W to be subjected to a hot isostatic pressing treatment (hereinafter may be referred to as "HIP treatment"). Heaters 15 are disposed between the lowest shelf plate 14*a* and the lower end of the flow uniforming cylinder 13. The flow uniforming cylinder 13 is fixed to the structure body 10 with use of a bracket (not shown) or the like. In the following description, the inside of the flow uniforming cylinder 13 is designated "treatment chamber 21."

A large number of vertical through holes 22*a*, 22*b*, 22*c* and 22*d* are formed in the shelf plates 14*a* to 14*d* respectively so that gas can move freely vertically within the flow uniforming cylinder 13.

The agitator 16 is made up of a fan 23 and a motor 24. The fan 23 is for ventilating the treatment chamber 21. The fan 23 is a conventional propeller fan having inclined blades and is disposed in the fan hole 20. The fan 23 is connected through a driving shaft to the motor 24 which underlies the fan and is driven by the motor. The motor 24 is received in a motor hole 25 formed in the lower lid 6 and is urged upward by a cooling control valve actuating spring 26 disposed between the motor and the bottom of the motor hole 25.

Generally, the high pressure vessel in the hot isostatic pressing apparatus is characteristic in that a low temperature gas is apt to stay near the lower lid when the temperature is high. Therefore, by disposing the motor 24 in the lower lid 6, the temperature near the motor 24 can be easily maintained at a level of not higher than the heat-resisting temperature of the motor 24. A downward movement of the motor 24 is performed using a drive unit (not shown), for example using gas pressure, oil pressure or electric motor.

The cooling control valve 17 is formed by a bottom plate 27 and a valve body 28. The bottom plate 27 is a disc having a central circular hole 29. The portion near the edge of the circular hole 29 acts as a valve seat. The bottom plate 27 is fixed to the structure body 10 substantially horizontally under the flow uniforming cylinder 13. The valve body 28 is made up of a thick disc-like valve body portion 30 and a columnar support portion 31 projecting downward from the center of a lower surface of the valve body portion 30, with a through hole 32 being formed at the center of the valve body.

In the valve body 28, the driving shaft is extended through the through hole 32 and a projecting end of the support portion 31 is fixed to the motor 24. That is, together with the fan 23 and the motor 24, the valve body 28 can move vertically through the high pressure vessel 2. In the valve body 28, the portion near the edge of an upper surface of the valve body 30 moves into abutment against or away from the portion near the edge of the hole 29 in the bottom plate 27, whereby the valve body 28 opens or closes the hole 29. A sealing ring 33 is disposed on the peripheral portion of the upper edge of the valve body portion 30 to ensure a hermetically sealed condition when the cooling control valve 17 is closed.

An argon gas inlet port 34 communicating with the communication passage 9*a* and a liquid argon inlet port 35 are open between the bottom plate 27 and the lower lid cover 12.

The isolation chamber-forming member in the present invention is constituted by the structure body 10 and the lid 11.

The treatment chamber-forming member in the present invention is implemented by the flow uniforming cylinder 13.

The inert medium supply system 3 is made up of an argon gas supply unit 36, an argon gas supply line 37, a liquid argon supply unit 38, a liquid argon supply line 39 and a discharge line 40.

The argon gas supply unit 36 is made up of a gas storage (not shown) having plural (25 or 30) gas cylinders charged with argon gas and connected together by a confluent pipe, with only one outlet being formed, as well as a pressure reducing valve and a safety valve (neither shown) both connected to the outlet of the gas storage. Argon gas supplied from the argon gas supply unit 36 is fed to the high pressure vessel 2 though the argon gas supply line 37.

The argon gas supply line 37 includes a compressor 41 and a first stop valve 42 and raises the pressure of the argon gas supplied from the argon gas supply unit 36 up to a predetermined level and then supplies the thus pressurized argon gas to the communication passage 9*a* in the high pressure vessel 2.

The liquid argon supply unit 38 is constituted by a storage tank (not shown) of a vacuum heat-insulating structure equipped with a safety valve. Liquid argon supplied from the liquid argon supply unit 38 is fed to the high pressure vessel 2 through the liquid argon supply line 39.

The liquid argon supply line 39 includes a cryogenic pump 43 and a second stop valve 44 and supplies the liquid argon fed from the liquid argon supply unit 38 to the communication passage 9*b* in the high pressure vessel 2.

The cryogenic pump is a known, commercially available pump which can discharge liquid gas of an extremely low temperature at a high pressure.

The discharge line 40 is a line for the recovery or discharge of argon gas from the high pressure vessel 2. The discharge line 40 communicates at one end thereof with the communication passage 9*a* and extends through a third stop valve 45, then is branched to a line communicating with the argon gas supply unit 36 and a line communicating with the atmosphere through a fourth stop valve 46.

Next, a description will be given below about HIP treatment for a nickel-based superalloy material which treatment is performed by the hot isostatic pressing apparatus 1 under the conditions of a temperature of about 1200° C. and a pressure of about 100 MPa.

Figure 3:
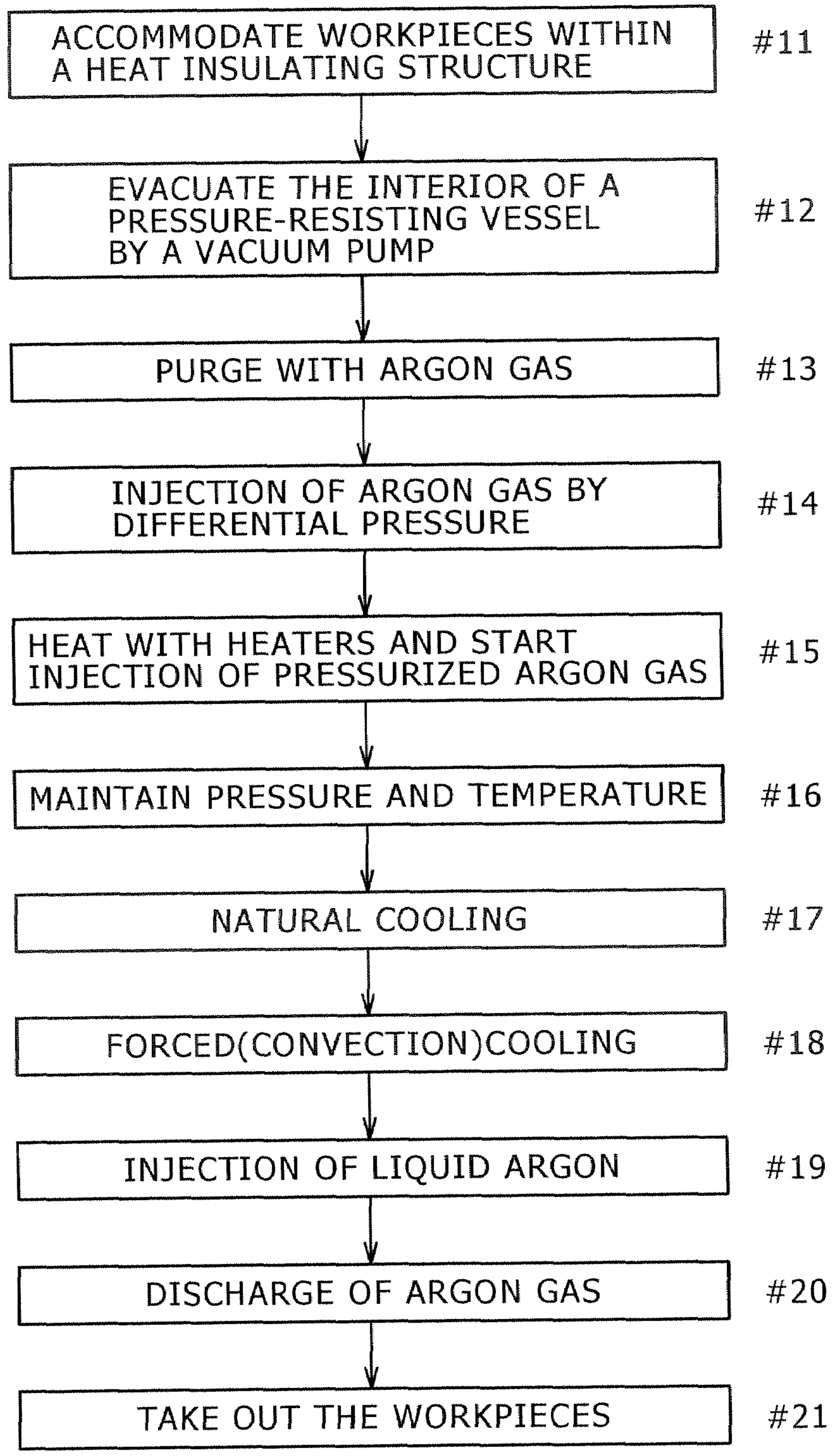
FIG. 3 is a flow chart of HIP treatment.
Figure 4:
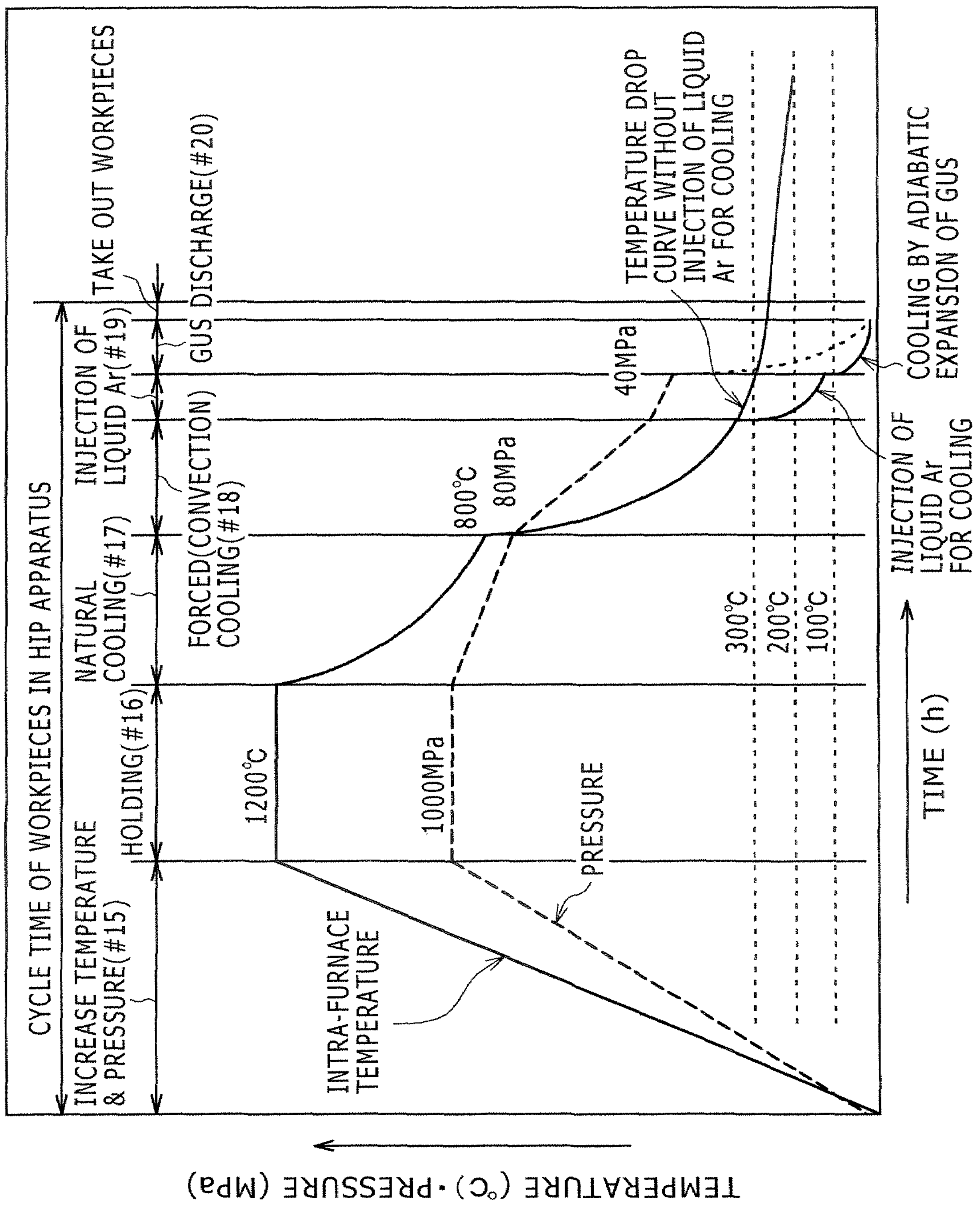
FIG. 4 is a diagram showing temperature and pressure changes in HIP treatment.

FIG. 3 is a flow chart of HIP treatment, FIG. 4 is a diagram showing temperature and pressure changes in HIP treatment, and FIGS. 5 to 8 are diagrams each showing the motion of argon within the high pressure vessel 2.

First, the upper lid 5 and the lid 11 of the heat insulating structure 7 are moved upward and workpieces W are placed on the shelf plates 14*a* to 14*d* in the treatment chamber 21. The lid 11 is closed and the lid 5 of the high pressure vessel 2 is closed while making sure that the upper lid 5 can withstand a high pressure (#11).

Subsequently, the air present within the high pressure vessel 2 is exhausted by means of a vacuum pump (not shown) connected to the argon gas supply line 37 (#12). When a vacuum indicator (not shown) attached to a line communicating to the high pressure vessel 2 or the vacuum pump indicates a pressure of a predetermined level or lower, the evacuating work is ended and argon gas having been pressure-reduced to about 1 MPa in the argon gas supply unit 36 is injected into the high pressure vessel 2 through the third stop valve 45 and the communication passage 9*a*. When a pressure gauge (not shown) attached to the high pressure vessel 2 indicates a pressure approximately equal to the argon gas supply pressure in the argon gas supply unit 36, the injection of argon gas is stopped and the fourth stop valve 46 is opened, allowing the argon gas present within the high pressure vessel 2 to be discharged through the discharge line 40. Such a purging work of replacing the air remaining in the high pressure vessel 2 with argon gas is performed two or three times (#13).

The argon gas supply pressure from the argon gas supply unit 36 is set to about 10 MPa and argon gas is injected into the high pressure vessel 2 through the third stop valve 45 (differential pressure injection, #14).

When the internal pressure of the high pressure vessel 2 and the argon gas supply pressure have become almost equal to each other and the rise of the internal pressure of the high pressure vessel 2 has stopped, the heaters 15 are turned ON to start heating, the third stop valve 45 is closed, while the first stop valve 42 is opened, then the compressor 41 is driven and the pressurized argon gas is fed into the high pressure vessel 2 (#15). Further, the motor 24 is turned ON to rotate the fan 23.

Figure 5:
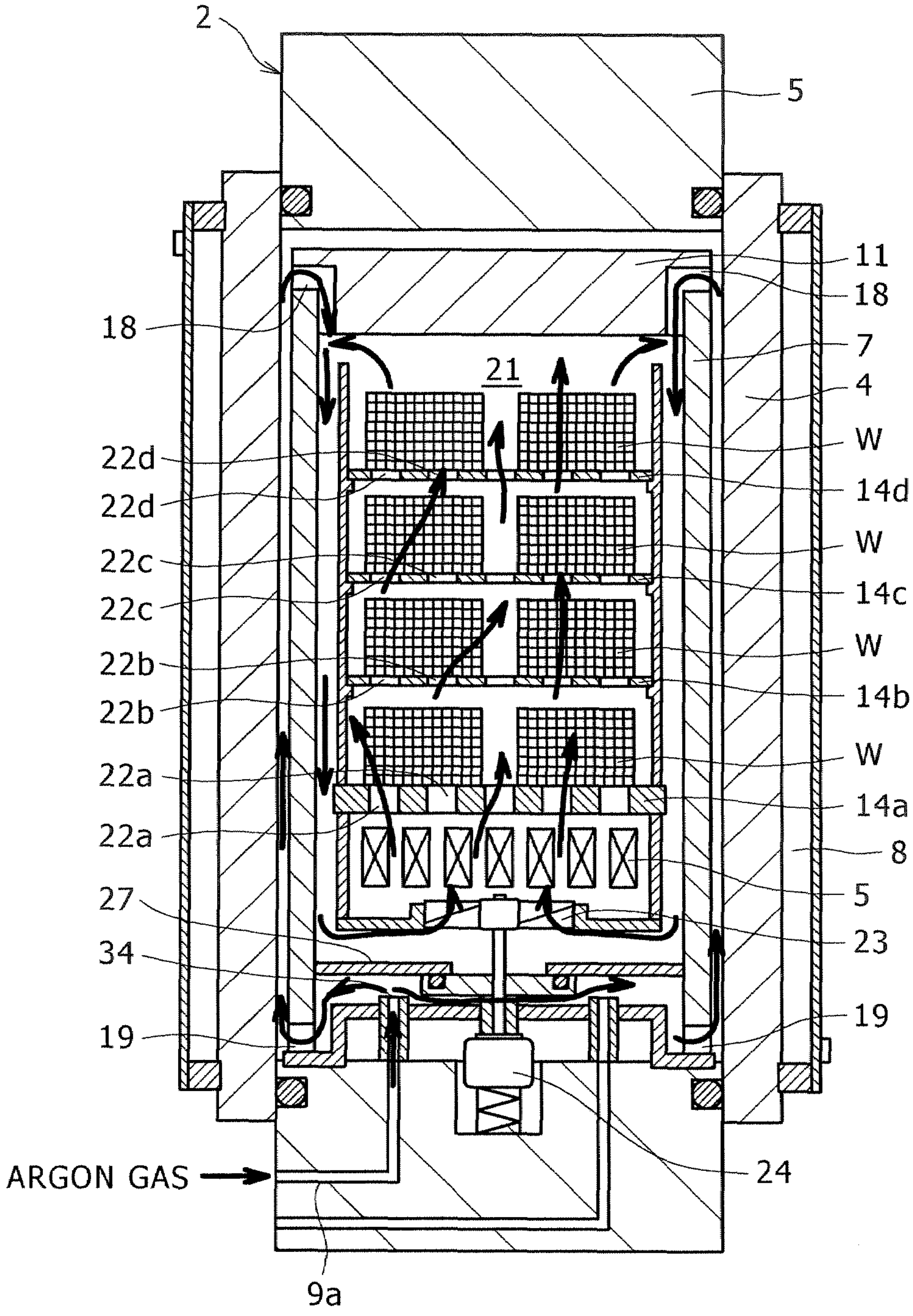
FIG. 5 is a diagram showing the motion of argon within the high pressure vessel in HIP treatment.

Referring to FIG. 5, the argon gas fed from the argon gas inlet port 34 into the high pressure vessel 2 passes through the lower gas passages 19 and rises between the pressure-resisting cylinder 4 and the heat-insulating structure 7, then passes through the upper gas passages 18 and enters the interior of the heat insulating structure 7. In the interior of the heat insulating structure 7, the argon gas forms an ascending gas flow inside the treatment chamber 21 and a descending gas flow outside the same chamber under both forced convection induced by rotation of the fan 23 and natural convection induced by heating with the heaters, thus circulating inside and outside the treatment chamber 21. The descending gas flow outside the treatment chamber 21 strikes against the bottom plate 27 located near the lower end of the heat insulating structure 7 and becomes an inward flow, then is sucked in by the fan 23 and circulates within the treatment chamber 21 with the workpieces W received therein, thereby creating an isothermal condition.

As to the fan 23, it is preferable to use an axial type which is large in wind volume despite a small size.

Since a large number of holes 22*a*, 22*b*, 22*c* and 22*d* are formed in the shelf plates 14*a* to 14*d* respectively, the circulation of argon gas is performed in a satisfactory manner without being obstructed by the shelf plates 14*a* to 14*d* and the workpieces W are heated efficiently when the internal pressure of the high pressure vessel 2 measured by a pressure gauge (not shown) has reached a predetermined pressure (100 MPa), the first stop valve 42 is closed to stop the supply of argon gas from the argon gas supply line 37. When the temperature of the treatment chamber 21 measured by a thermometer (not shown) has reached a predetermined temperature (1200° C.), the temperature raising operation is stopped and switching is made to the holding of temperature by turning ON and OFF of the heaters 15.

In the interior of the high pressure vessel 2, with argon gas sealed therein, the interior of the treatment chamber 21 is held at an approximately constant temperature for a predetermined period of time (#16). Even with the pressure and temperature maintained in such a state, the argon gas present within the heat insulating structure 7 is circulated by the fan 23 and the workpieces are heated by the gas flow of high pressure and are maintained at a high temperature.

Figure 6:
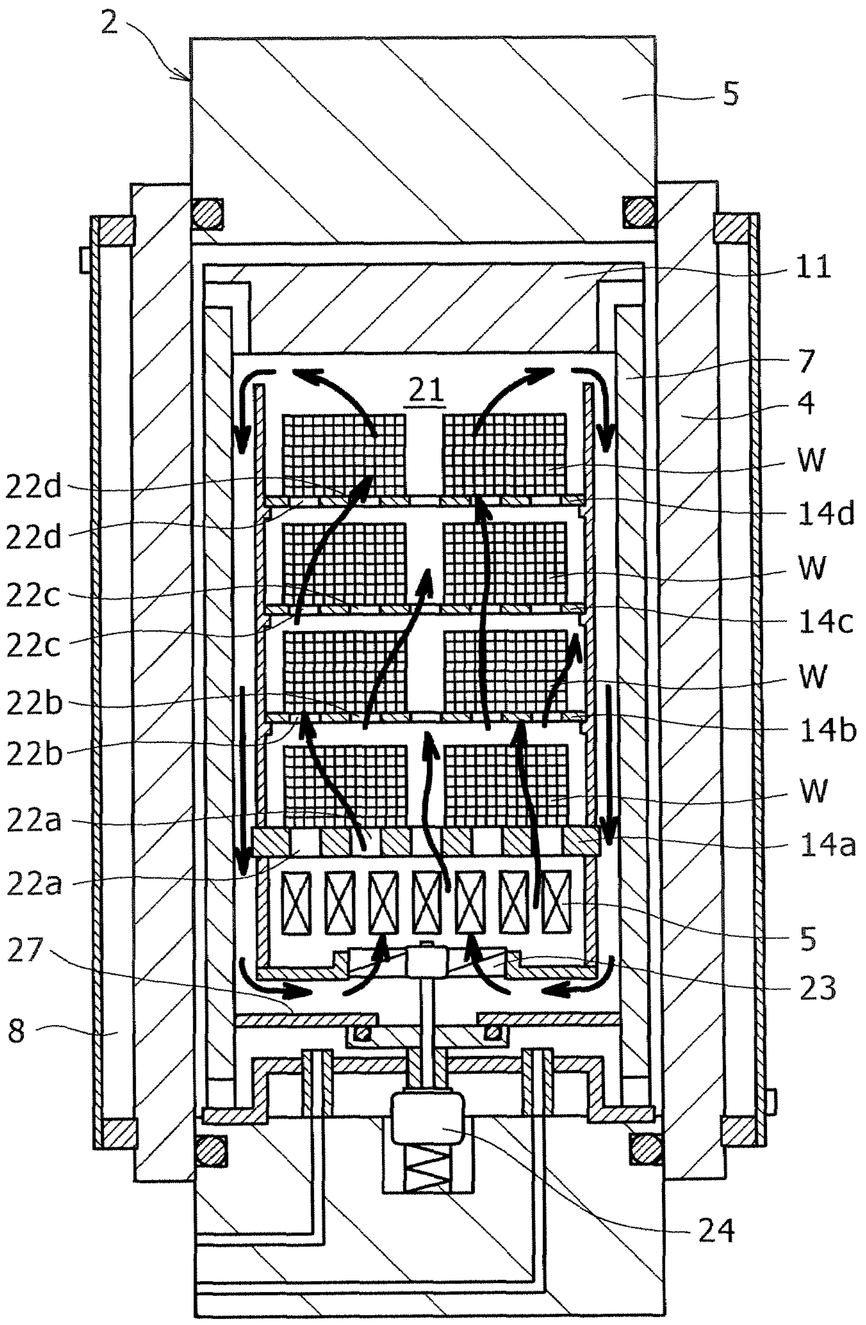
FIG. 6 is a diagram showing the motion of argon within the high pressure vessel in HIP treatment.

In this step (#16), the gas flow is heated by the heaters 15 and the high pressure gas which has thus become light flows as an ascending flow while describing autogenously such loops as shown in FIG. 6. The fan 23 is for promoting this gas flow. The gas flow can be weakened by reversing the rotational direction of the fan 23. Anyhow, in order to achieve an isothermal condition, natural convection is promoted by forced convection, that is, what is called a natural phenomenon is utilized. In this point this heating method is an excellent heating method.

After the internal pressure of the high pressure vessel 2 and the temperature of the treatment chamber 21 are held for the predetermined period of time, cooling is performed.

The cooling step is performed in at least three stages according to temperature. First, at the end of the holding, i.e., with argon gas sealed within the high pressure vessel 2, the heating by the heaters 15 is stopped completely and in this state cooling is started. The argon gas present within the heat insulating structure 7 is allowed to circulate through the interior of the heat insulating structure 7 as in FIG. 6 by the fan 23 and is cooled by heat dissipation based on heat conduction passing through both structure body 10 and lid 11. The workpieces W are cooled by the thus-cooled argon gas (#17). Particularly, in the initial stage of cooling in which the temperature of the treatment chamber 21 is the predetermined temperature (1200° C.) in HIP treatment, the amount of heat dissipated through the heat insulating structure 7 is large, so that the treatment chamber 21, i.e., the workpieces W in the treatment chamber 21, are cooled at a relatively high cooling speed. At this time, it is preferable to drive the fan 23 in order to diminish the temperature distribution in the treatment chamber 21.

In natural cooling, the internal pressure of the high pressure vessel 2 drops naturally in accordance with the Boyle-Charles' law (see FIG. 4).

Figure 7:
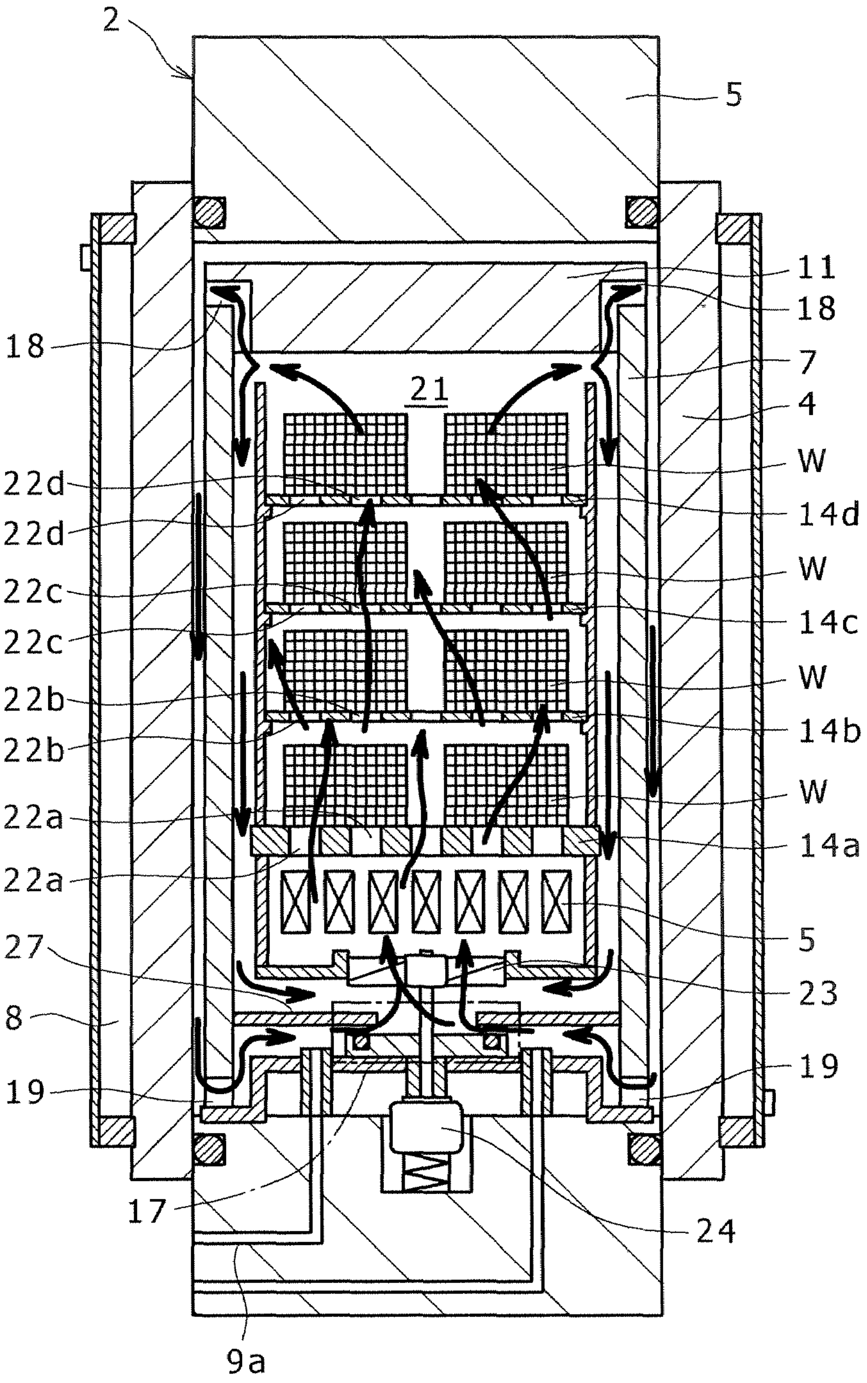
FIG. 7 is a diagram showing the motion of argon within the high pressure vessel in HIP treatment.

When the temperature of the treatment chamber 21 becomes a temperature near 800° C. (the pressure at this time is about 80 MPa) at which the cooling speed based on natural cooling decreases, forced (convection) cooling is started. Further, the motor 24 is moved down to open the cooling control valve 17 (#18). As a result of the cooling control valve 17 having become open, the argon gas present within the treatment chamber 21 creates a circulating flow advancing from the treatment chamber 21, then through the upper gas passages 18, between the pressure-resisting cylinder 4 and the heat insulating structure 7, further through the lower gas passages 19, cooling control valve 17 and fan 23, and returning to the treatment chamber 21, as shown in FIG. 7. The heat of the argon gas thus circulating through this route is removed by an inner surface of the high pressure vessel 2 which is cooled directly by cooling water flowing through the interior of the jacket 8, so that the cooling of the workpieces W is promoted by the thus heat-removed argon gas.

The valve body 28 is configured to move vertically through the interior of the high pressure vessel 2 together with the fan 23 and the motor 24, thereby opening and closing the hole 29 formed in the bottom plate 27, thus permitting the fan 23 and the opening/closing portion to be disposed at the center of the high pressure vessel 2. Consequently, it is possible to let the argon gas present within the treatment chamber 21 flow without causing a deflecting flow or a stagnant portion and prevent the occurrence of a temperature distribution.

If the internal temperature of the treatment chamber 21 is in the range of 500° to 800° C., then if the argon gas of such a high temperature flows out in a large quantity from the upper gas passages 18 to between the pressure-resisting cylinder 4 and the heat insulating structure 7, there is a fear that the pressure-resisting cylinder 4 may be overheated locally in its portions located near the upper gas passages 18. To avoid such an inconvenience, the amount of argon gas flowing out from the upper gas passages 18 to between the pressure-resisting cylinder 4 and the heat insulating structure 7 is adjusted by controlling the opening/closing motion or the degree of opening of the cooling control valve 17. Control of the rotating speed of the fan 23 may also be done at the same time for adjusting the amount of argon gas. For suppressing the local overheating of the pressure-resisting cylinder 4 it is also recommended to attach a skirt member to the lid 11 so as to cover the opening portions of the upper gas passages 18.

When the internal temperature of the treatment chamber 21 becomes 500° C. or lower, the cooling speed decreases, so in order to promote the cooling, not only the rotating speed of the fan 23 is increased, but also the cooling control valve 17 is fully opened.

The next stage of cooling is performed after the internal temperature of the treatment chamber 21 has been reduced to 300° C. or so (the pressure at this time is about 40 MPa).

Figure 8:
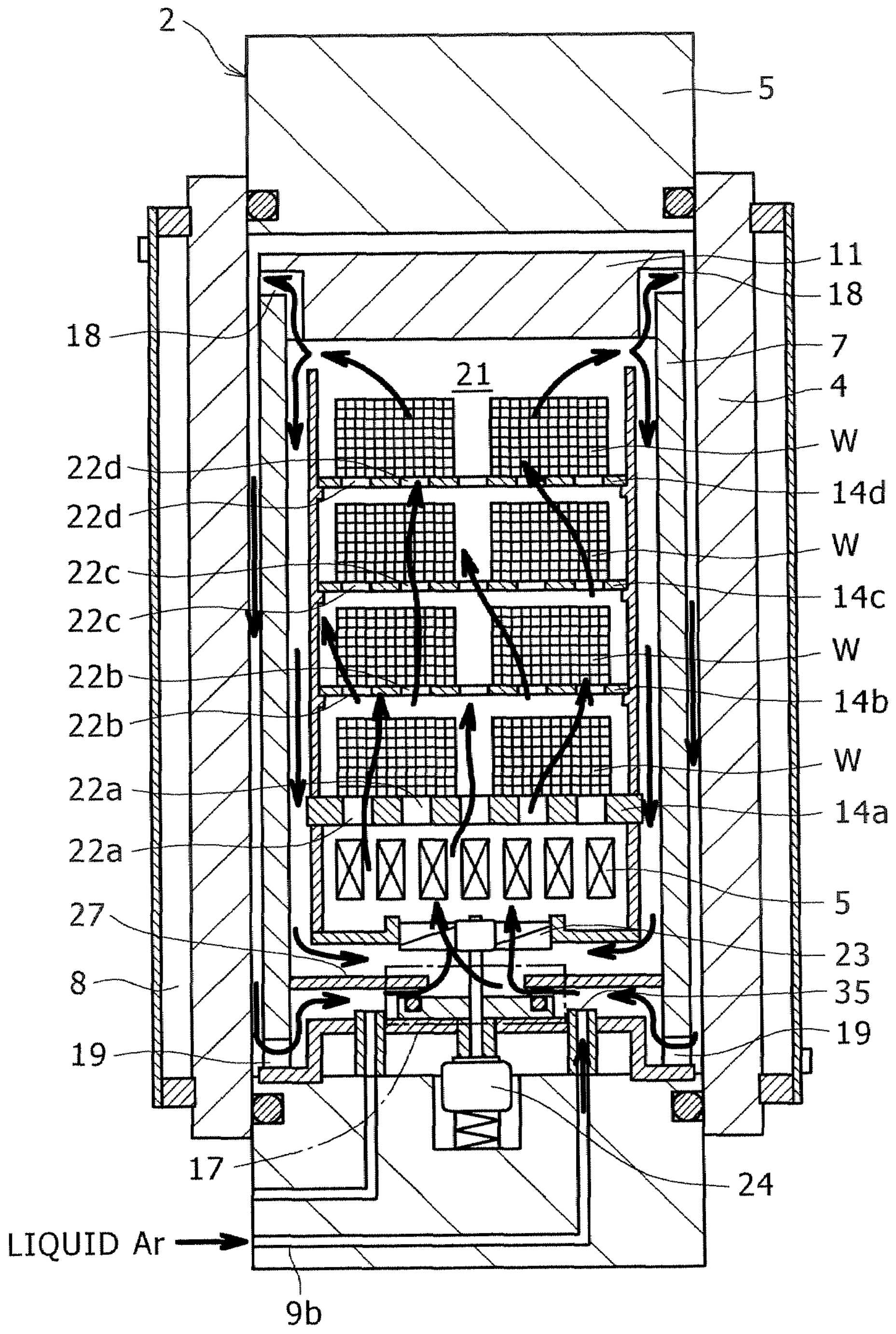
FIG. 8 is a diagram showing the motion of argon within the high pressure vessel in HIP treatment.

When the internal temperature of the treatment chamber 21 becomes 300° C. or so, with only the removal of heat by an inner surface of the pressure-resisting cylinder 4 whose temperature has dropped to 100° C. or so by cooling with cooling water, the cooling speed decreases to the extreme degree. To prevent this, the second stop valve 44 is opened to actuate the cryogenic pump 43 and, as shown in FIG. 8, liquid argon is supplied through the liquid argon supply line 39 and the communication passage 9*b* from the liquid argon supply unit 38 and is injected into the pressure-resisting cylinder 4 from the liquid argon inlet port 35 to promote the cooling of the workpieces W (#19).

The boiling point of the liquid argon is negative 185° to 186° C. and is thus extremely low, so when injected in a liquid state, the liquid argon evaporates in the interior of the high pressure vessel 2. At this time, the latent heat of vaporization of the argon gas deprives the surroundings of heat and the gas drops in temperature. The argon gas thus reduced in temperature is fed into the treatment chamber 21 by the fan 23 and cools the workpieces W efficiently.

The internal pressure rises upon evaporation of the liquid argon in the interior of the high pressure vessel 2, but when the pressure rises to excess, the argon gas present in the interior of the high pressure vessel 2 is discharged to the exterior through the argon gas inlet port 34, the communication passage 9*a* and the discharge line 40.

In the discharge of argon gas to the exterior which is performed upon excessive rise of pressure, a completely vaporized and temperature-increased state by absorption of the heat present in the high pressure vessel 2 is efficient for promoting the cooling, so it is preferable that the liquid argon inlet port 35 be formed in a position spaced away from the argon inlet port 34.

There is a possibility that the liquid argon may vaporize in the liquid argon supply line 39 and the communication passage 9*b* for several minutes just after the start of supply or may vaporize partially during the supply at a certain outside temperature. However, since the temperature of the argon gas resulting from vaporization is extremely low, there is little influence on the cooling within the treatment chamber 21.

By thus vaporizing the liquid argon and cooling the interior of the treatment chamber 21 with the heat of vaporization, it is possible to greatly shorten the time required for cooling from 300° C. or so down to 100° C. or so.

The injection of liquid argon is terminated when the internal temperature of the treatment chamber 21 drops to a temperature of 100° to 150° C. and the final stage of cooling is performed.

In the final stage of cooling, the third stop valve 45 and the fourth stop valve 46 are opened in a closed state of both first stop valve 42 and second stop valve 44, thereby allowing the argon gas of 35 to 45 MPa present within the high pressure vessel 2 to the exterior of the system (#20). At this time, the line branched from the discharge line 40 and reaching the liquid argon supply unit 38 is shut off with a valve (not shown) closed.

As a result of discharge of the high-pressure argon gas, the argon gas present within the high pressure vessel 2 expands rapidly in a heat insulated state and the temperature thereof drops rapidly on the basis of the first law (adiabatic expansion) of thermodynamics. By the effect of cooling based on such an adiabatic expansion, the temperature of the workpieces W can be decreased to near the room temperature (a temperature permitting the workpieces W to be taken out (#21)) upon drop of the internal pressure of the high pressure vessel 2 to near the atmospheric pressure. Thus, the discharge of the high pressure argon gas is efficient for cooling the workpieces W.

Thus, by discharge of the high pressure argon gas present within the high pressure vessel 2, it is possible to greatly shorten the time required for cooling the workpieces W from the temperature of 100° to 150° C. down to the temperature permitting the workpieces to be taken out.

In the case where the injection of liquid argon in the second stage of cooling (#19) is not performed, a time several ten times as long as the time in the above method is required for cooling the temperature of the treatment chamber 21 to 100° C. or lower.

Figure 9:
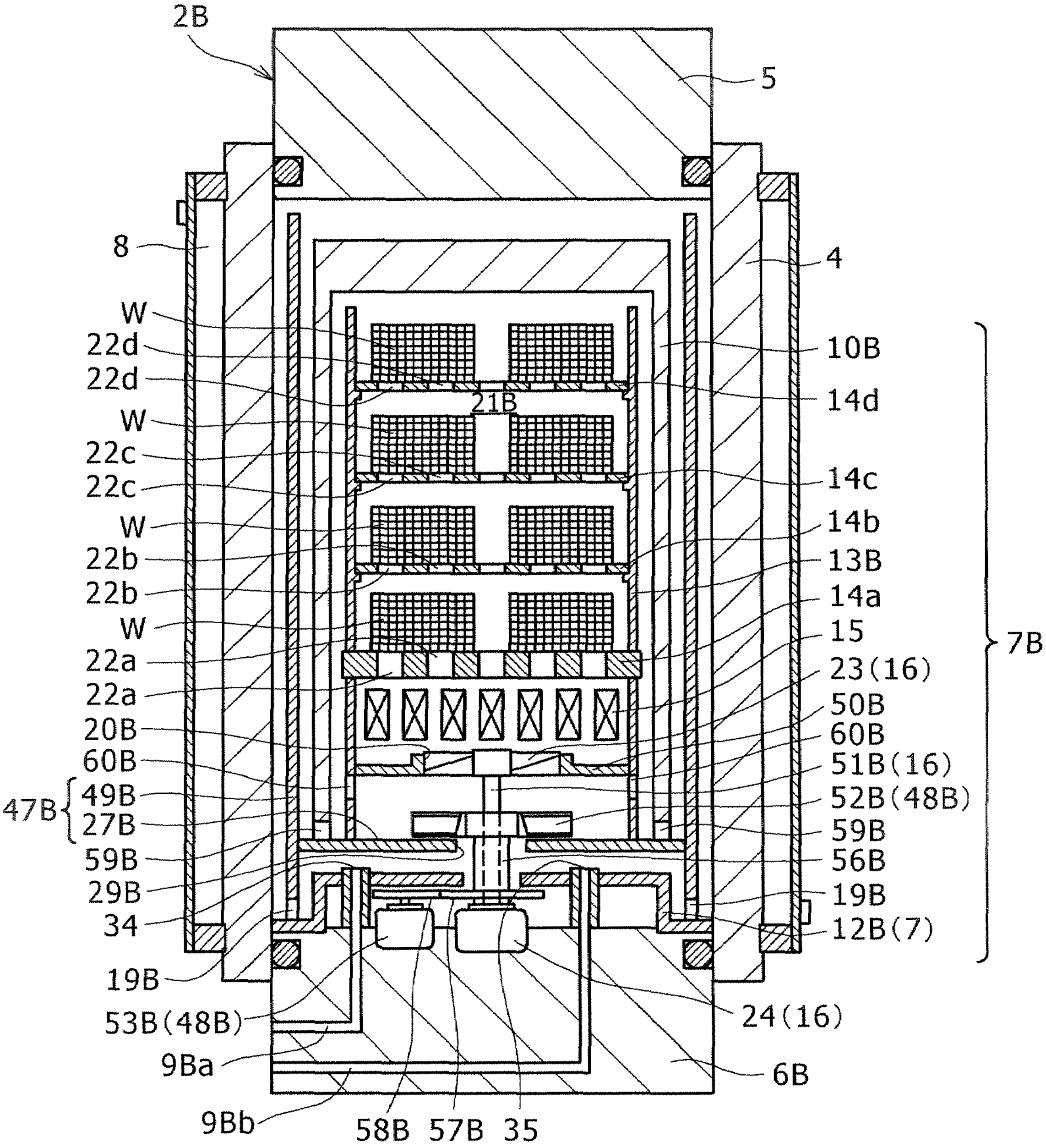
FIG. 9 is a sectional front view of a high pressure vessel in another embodiment of the present invention.

FIG. 9 is a sectional front view of a high pressure vessel 2B used in a hot isostatic pressing apparatus according to another embodiment of the present invention. An inert medium supply system connected to the high pressure vessel 2B has the same configuration as that of the inert medium supply system 3 used in the hot isostatic pressing apparatus 1. In the high pressure vessel 2B (FIG. 9), the portions identified by the same reference numerals as in the high pressure vessel 2 (FIG. 2) are of the same configurations as in the high pressure vessel 2. With reference to FIG. 9, a description will be given below mainly about the difference in configuration of the high pressure vessel 2B from the high pressure vessel 2.

The high pressure vessel 2B comprises a pressure-resisting cylinder 4, an upper lid 5, a lower lid 6B and a heat insulating structure 7B.

The pressure-resisting cylinder 4 is closed at an upper end thereof with the upper lid 5 and at a lower end thereof with the lower lid 6B and, together with the upper and lower lids, constitutes a pressure-resisting vessel.

Two separate communication passages 9Ba and 9Bb for communication between the exterior and the interior of the high pressure vessel 2B are formed in the interior of the lower lid 6B.

The heat insulating structure 7B comprises a lower lid cover 12B, an isolation cylinder 47B, a structure body 10B, a flow uniforming cylinder 13B, shelf plates 14*a* to 14*d*, heaters 15, an agitator 16, a cooler 48B and the like.

The lower lid cover 12B is formed by a plate member which is projected circularly upward on its inner side in plan, and its peripheral portion is fixed to the lower lid 6B.

The isolation cylinder 47B is made up of a cylindrical portion 49B having a diameter smaller than the inside diameter of the pressure-resisting cylinder 4 and a bottom plate 27B which is fixed substantially horizontally to a lower portion of the cylindrical portion 49B so as to partition the interior of the cylindrical portion 49B vertically. A circular hole 29B is formed at the center of the bottom plate 27B. The isolation cylinder 47B is fixed at its lower end to the lower lid cover 12B and plural lower gas passages 19B for communication between the interior and the exterior of the cylindrical portion 49B are formed in the lower end of the isolation cylinder 47B.

The isolation chamber-forming member in the present invention is implemented by the isolation cylinder 47B.

The structure body 10B is in a cylindrical shape having an upper bottom and a lower open end thereof is made integral with the bottom plate 27B removably. Plural first gas passages 59B for communication between the interior and the exterior of the structure body 10B are formed in a lower end of the structure body 10B.

The flow uniforming cylinder 13B has an outside diameter smaller than the inside diameter of the structure body 10B and is received inside the structure body 10B in such a manner that a gap is formed between its upper end and an inner surface of the upper bottom of the structure body 10B. The flow uniforming cylinder 13B is open at its upper end and is provided in a lower portion thereof with a partition plate 50B so as to partition the interior thereof vertically. A generally circular fan hole 20B is formed at the center of the partition plate 50B. Plural second gas passages 60B for communication between the interior and the exterior of the flow uniforming cylinder 13B are formed in the flow uniforming cylinder 13B at positions below and close to the partition plate 50B.

The flow uniforming cylinder 13B is provided in the interior thereof with four shelf plates 14*a* to 14*d* which are arranged at approximately equal intervals from the lower end of the flow uniforming cylinder and each disposed horizontally. Heaters 15 are disposed between the lowest shelf plate 14*a* and the lower end of the flow uniforming cylinder. The flow uniforming cylinder 13B is fixed at its lower end to the bottom plate 27B and is made integral with the isolation cylinder 47B and the structure body 10B. In the following description, the inside of the flow uniforming cylinder 13B will be designated "treatment chamber 21B."Like the high pressure vessel 2, the shelf plates 14*a* to 14*d* are formed with a large number of vertical through holes 22*a*, 22*b*, 22*c* and 22*d*, respectively.

The treatment chamber-forming member in the present invention is implemented by the flow uniforming cylinder 13B.

The agitator 16 is made up of a fan 23 and a motor 24. The fan 23 is a conventional propeller fan having an inclined blade and is disposed in the fan hole 20B. The fan 23 is connected to and driven by the motor 24 through a driving shaft 51B, the motor 24 underlying the fan 23 and being fixed to the lower id 6B.

Figure 15A:
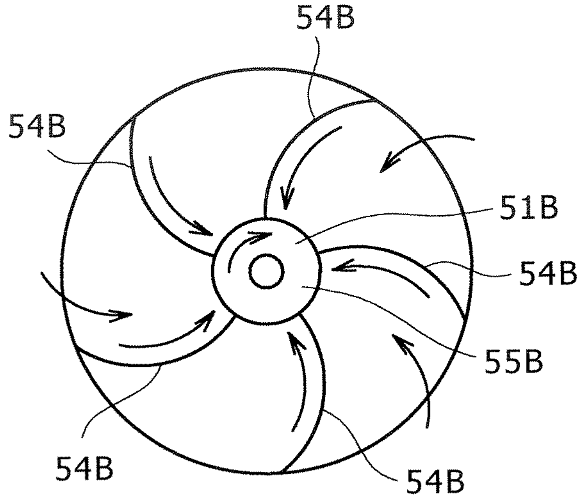
FIG. 15 is a diagram showing the state of blast in a cooling fan.
Figure 15B:
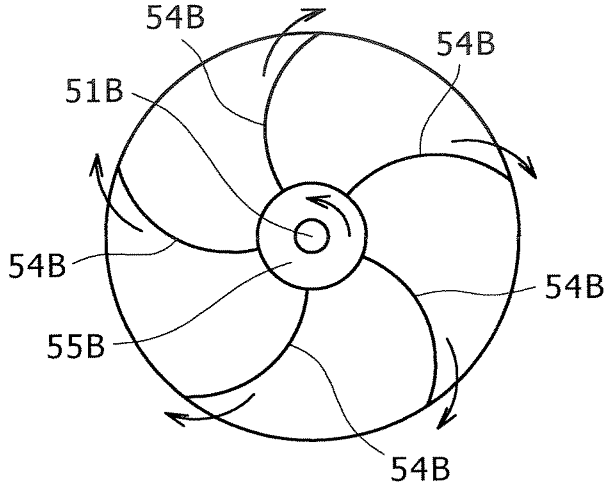

The cooler 48B is made up of a cooling fan 52B and a motor 53B. The cooling fan 52B is a radial type fan whose blade surfaces are parallel to the driving shaft. As shown in FIG. 15, blades 54B extend curvedly outwards from a central boss 55B. A driving shaft 56B which extends through the lower lid cover 12B rotatably is made integral with a lower surface of the boss 55B and the driving shaft 51B extends through through-holes formed at the center of the boss 55B and the driving shaft 56B. A driven gear 57B is fixed to the driving shaft 56B.

The motor 53B is disposed sideways of the motor 24 and is fixed to the lower lid 6B. A driving gear 58B is mounted on the shaft of the motor 53B and is in mesh with the driven gear 57B.

The motors 24 and 53B are accommodated within the lower lid cover 12B for the prevention of damage caused by the high temperature, high pressure gas present within the high pressure vessel 2B in HIP treatment.

By thus constructing the agitator 16 and the cooler 48B, the fan 23 and the cooling fan 52B can be disposed on the axis of the high pressure vessel 2B and can be rotated and stopped each independently. Moreover, in the temperature and pressure increasing step (#15) and the high temperature and pressure maintaining step (#16) in HIP treatment which will be described later, the motor 24 can be disposed in the lower lid 6B where a relatively low temperature gas is apt to stay and thus it is possible to prevent damage of the motors 24 and 53B.

Figure 10:
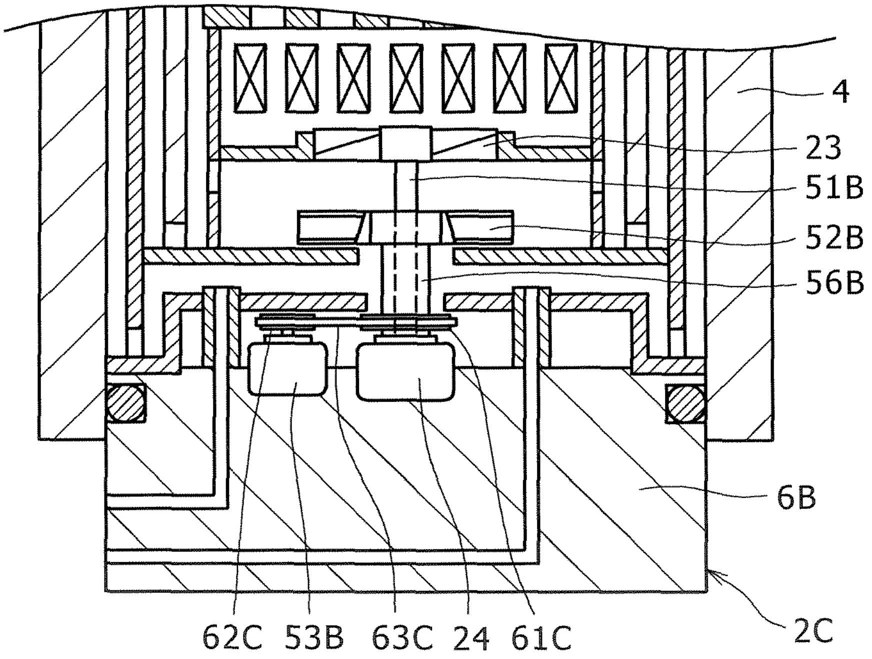
FIG. 10 is a diagram showing a drive mechanism for a cooling fan, the drive mechanism using pulleys and a belt.

The mechanism for the transfer of power between the cooling fan 52B and the motor 53B is not limited to the above gear meshing mechanism. There also may be used such a drive mechanism as shown in FIG. 10 which uses a pair of pulleys 61C, 62C and a belt 63C or a drive mechanism wherein the pulleys and the belt are replaced by sprockets and a chain, respectively. In the gear meshing mechanism, the diameter ratio of the gears 57B and 58B depends on a speed increasing ratio or a speed reducing ratio and therefore the installation distance between the two motors 24 and 53B is limited. On the other hand, in the drive mechanism using the pulleys 61C, 62C and the belt 63C and the drive mechanism using sprockets and a chain, the installation distance between the motors 24 and 53B can be determined relatively freely. The drive mechanism using sprockets and a chain is recommended because all the components thereof are formed by metal and are little damaged in a high temperature environment.

The following description is now provided about HIP treatment of a nickel-based superalloy material which treatment is performed by the hot isostatic pressing apparatus having the high pressure vessel 2B under the conditions of a temperature of about 1200° C. and a pressure of about 100 MPa.

FIGS. 11 to 14 illustrate the motion of argon within the high pressure vessel 2B and FIG. 15 illustrates the state of blast in the cooling fan 52B,.

The steps and treatment conditions in HIP treatment are the same as those in HIP treatment using the hot isostatic pressing apparatus 1 and therefore reference will be made below also to FIGS. 3 and 4.

First, the upper lid 5 and the pressure-resisting cylinder 4 are together moved upward, then the structure body 10B is moved upward and the workpieces W are placed on the shelf plates 14*a* to 14*d* in the treatment chamber 21B. The structure body 10B is brought down onto the bottom plate 27B and the upper lid 5 and the pressure-resisting cylinder 4 are brought down and fixed to the lower lid 6B so that they can withstand a high pressure, thus providing a hermetically sealed vessel as the high pressure vessel 2B (#11).

The high pressure vessel 2B is different from the high pressure vessel 2 in the previous embodiment in that the upper lid 5 and the pressure resisting cylinder 4 are separated from the lower lid 6B for taking in and out of workpieces W.

Subsequent evacuation of the interior of the high pressure vessel 2B (#12), purging of the interior of the high pressure vessel 2B with argon gas (#13) and differential pressure injection of argon gas (#14) are the same as those performed in the hot isostatic pressing apparatus 1.

After the differential pressure injection (#14) is over, the heaters 15 are turned ON to start heating and the argon gas increased in pressure by the compressor 41 is fed into the high pressure vessel 2 from the argon gas inlet port 34 (#15). Further, the motors 24 and 53B are turned ON to rotate the fan 23 and the cooling fan 52B.

Figure 11:
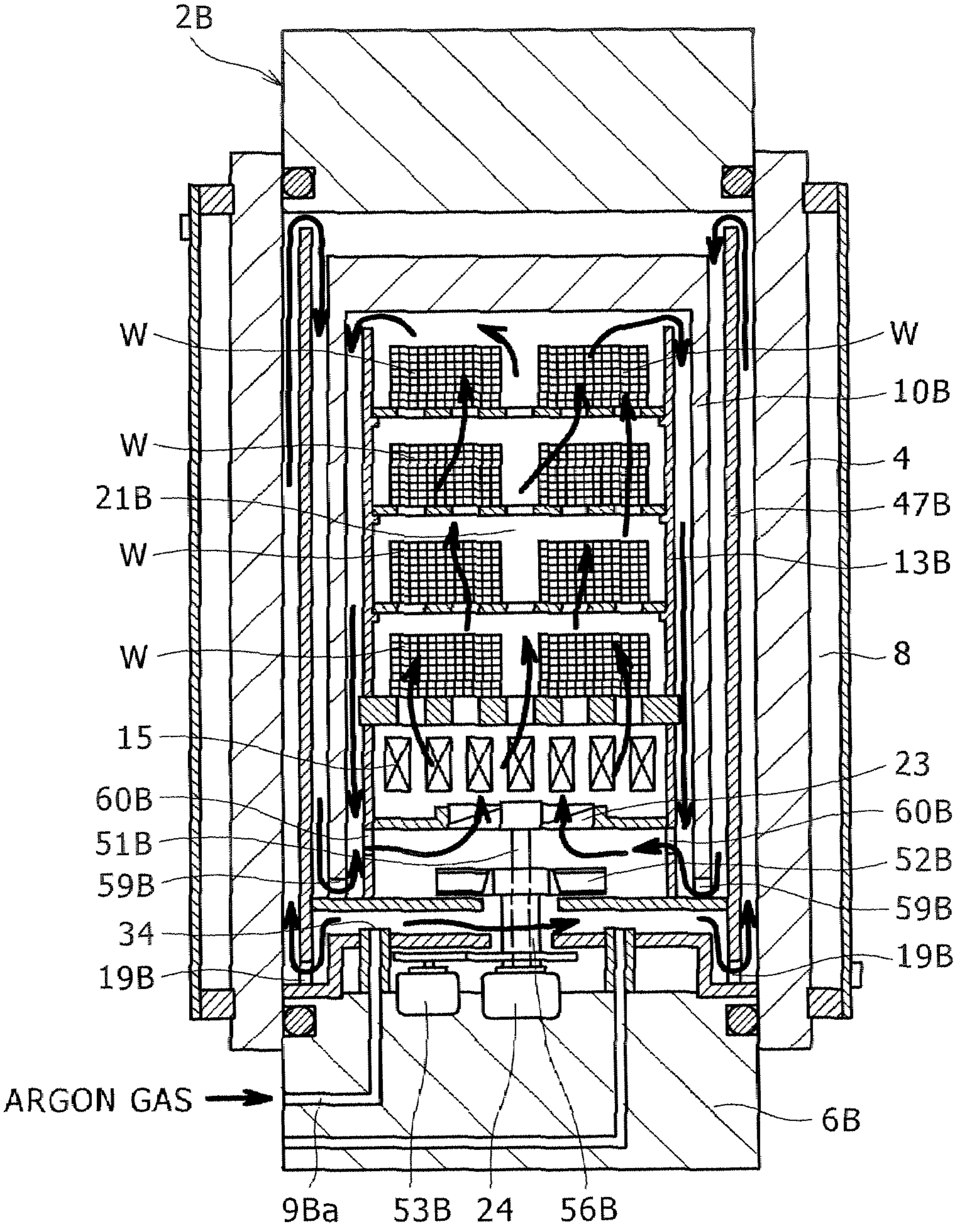
FIG. 11 is a diagram showing the motion of argon within the high pressure vessel in HIP treatment.

Referring to FIG. 11, the argon gas fed into the high pressure vessel 2 passes through the lower gas passages 19B, rises between the pressure-resisting cylinder 4 and the isolation cylinder 47B, then turns over and descends between the isolation cylinder 47B and the structure body 10B. The argon gas after the descent passes through the first gas passages 59B, then through the second gas passages 60B, then is sucked by the fan 23 and enters the treatment chamber 21B. In the treatment chamber 21B, the argon gas is heated by the heaters 15 and forms an upward flow under a natural convection induced by the buoyancy of the argon gas itself and a forced convection induced by the fan 23, thereby heating the workpieces W. The rising argon gas strikes against the upper bottom of the structure body 10B and descends between the flow uniforming cylinder 13B and the structure body 10B. The descending argon gas strikes against the bottom plate 27 located near the lower end of the structure body 10B and forms an inward flow, then is sucked by the fan 23 and enters the treatment chamber 21B. In the temperature/pressure raising step (#15), the argon gas injected into the high pressure vessel 2B circulates between the treatment chamber 21B, as well as the flow uniforming cylinder 13B, and the structure body 10B and creates an isothermal condition.

In the temperature/pressure raising step (#15), in order to suppress the dissipation of heat resulting from a natural convection induced by a difference in density between the argon gas of a high temperature present within the treatment chamber 21B and the argon gas of a low temperature present outside the isolation cylinder 47B, the cooling fan 52B is rotated reverse so as to compete with the natural convection (see FIG. 15(*a*)). As the cooling fan 52B, therefore, it is recommended to use a radial type fan capable of generating a head difference greater than the head difference based on gas density which serves as a driving force of the natural convection.

The high pressure vessel 2B is structurally a cylindrical furnace installed vertically and it is preferable that the flow of argon gas be axisymmetric in order to maintain the interior of the treatment chamber 21B in an isothermal condition and avoid a local deterioration in strength of the material of the high pressure vessel 2B caused by a high temperature. More specifically, it is ideal that the driving shafts 51B and 56B of the fan 23 and the cooling fan 52B be disposed on the axis of the high pressure vessel 2B.

When the temperature of the treatment chamber 2 1B has reached a predetermined temperature (1200° C.), the temperature raising operation is stopped and switching is made to the holding of temperature by ON/OFF of the heaters 15 (#16).

Figure 12:
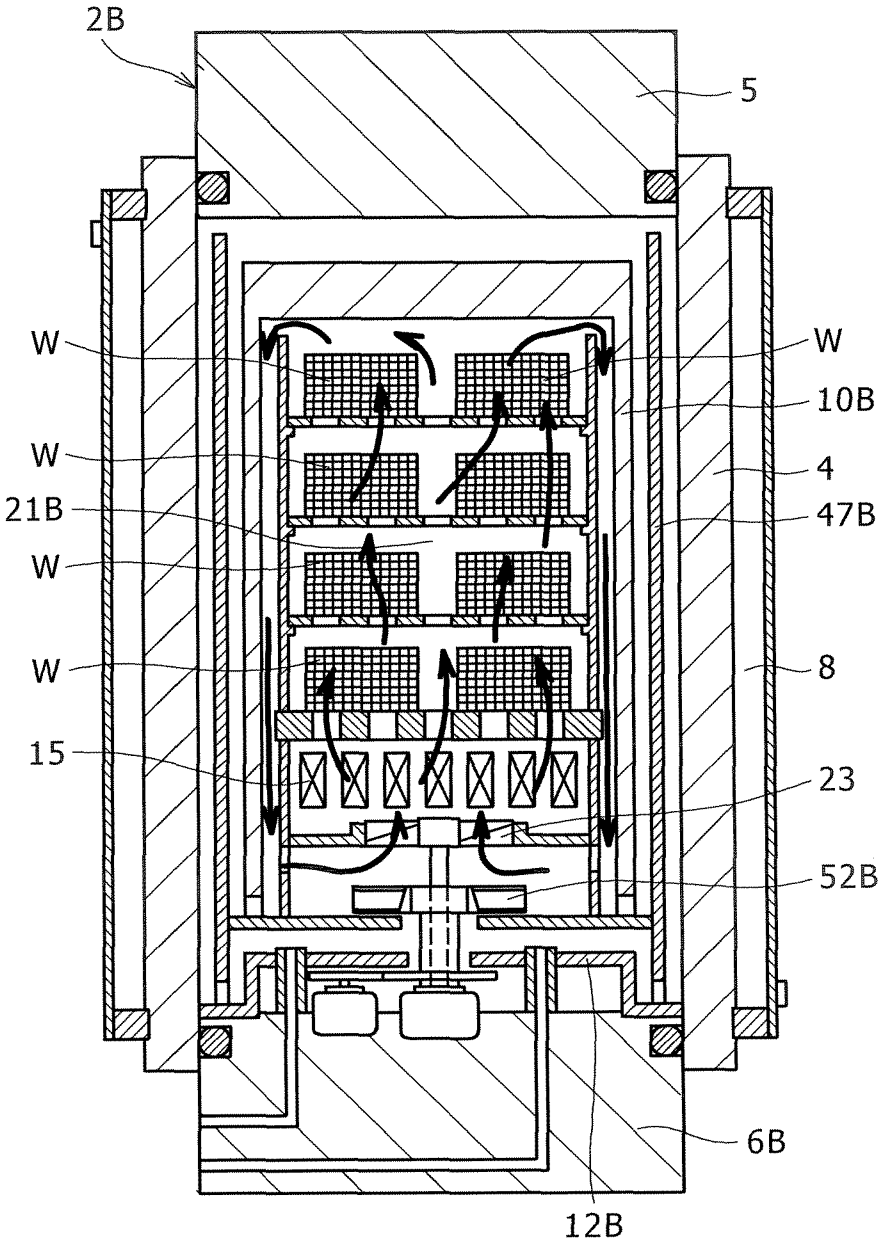
FIG. 12 is a diagram showing the motion of argon within the high pressure vessel in HIP treatment.

Also in this step (#16), the rotation of the fan 23 and that of the cooling fan 52B are continued. Within the structure body 10B and the treatment chamber 21B, the argon gas forms such circulating flows as shown in FIG. 12 to prevent the occurrence of a temperature distribution. The cooling fan 52B is rotated reverse at a rotation speed suitable for preventing the argon gas cooled between the isolation cylinder 47B and the pressure-resisting cylinder 4 from passing between the bottom plate 27B and the lower lid cover 12B and getting from the hole 29B into the structure body 10B.

After the internal pressure of the high pressure vessel 2B and the temperature of the treatment chamber 21B are held for a predetermined time, cooling is performed in three stages.

Initial cooling is started upon complete stop of the heating by the heaters 15 after the high temperature, high pressure holding step (#16). The argon gas present within the high pressure vessel 2B is cooled by natural cooling with the upper lid 5 and the pressure-resisting cylinder 4 which are lower in temperature than the argon gas (#17).

Figure 13:
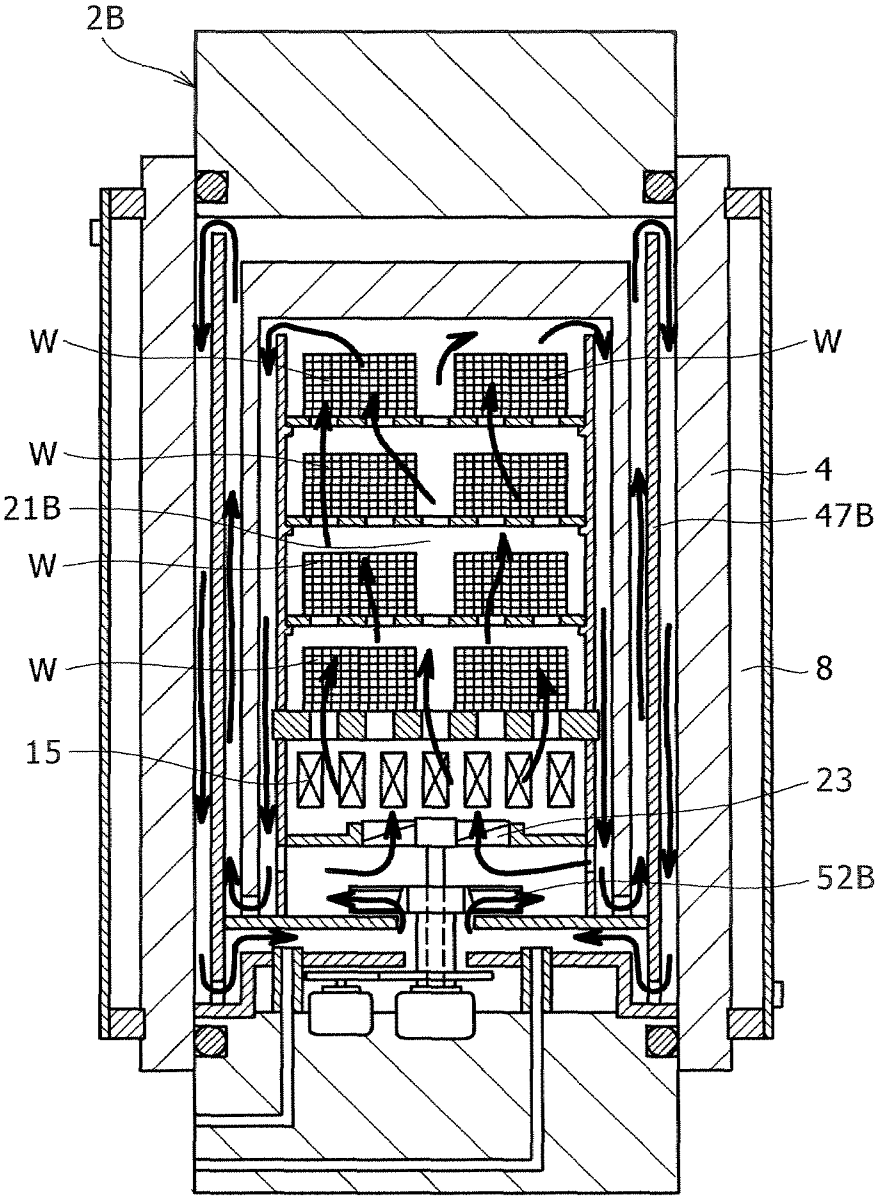
FIG. 13 is a diagram showing the motion of argon within the high pressure vessel in HIP treatment.

When the temperature of the treatment chamber 21B has become a temperature close to 800° C. (about 80 MPa) at which the cooling speed by natural cooling decreases, forced (convection) cooling is started. More specifically, the cooling fan 52B is rotated in the normal direction (see FIGS. 15(*b*)) to suck in the argon gas water-cooled between the isolation cylinder 47B and the pressure-resisting cylinder 4 and the argon gas thus decreased in temperature forms circulating flows to cool the workpieces W, as shown in FIG. 13.

By the normal rotation of the cooling fan 52B, the amount of the argon gas flowing between the isolation cylinder 47B and the pressure-resisting cylinder 4 increases to a large extent in comparison with that in natural convection, so that the cooling by the inner surface of the pressure-resisting cylinder 4 is promoted and it becomes possible to increase the cooling speed of the workpieces W. The cooling speed is controlled by controlling the rotation speed of the cooling fan 52B. Actually, the cooling speed is programmed and the rotation speed of the cooling fan 52B is controlled in accordance with the program. As to soaking, usually a target is ±5° C. or so, but if the temperature deviates from this control range in the treatment, the rotation speed of the fan 23 is increased to increase the amount of argon gas.

Figure 14:
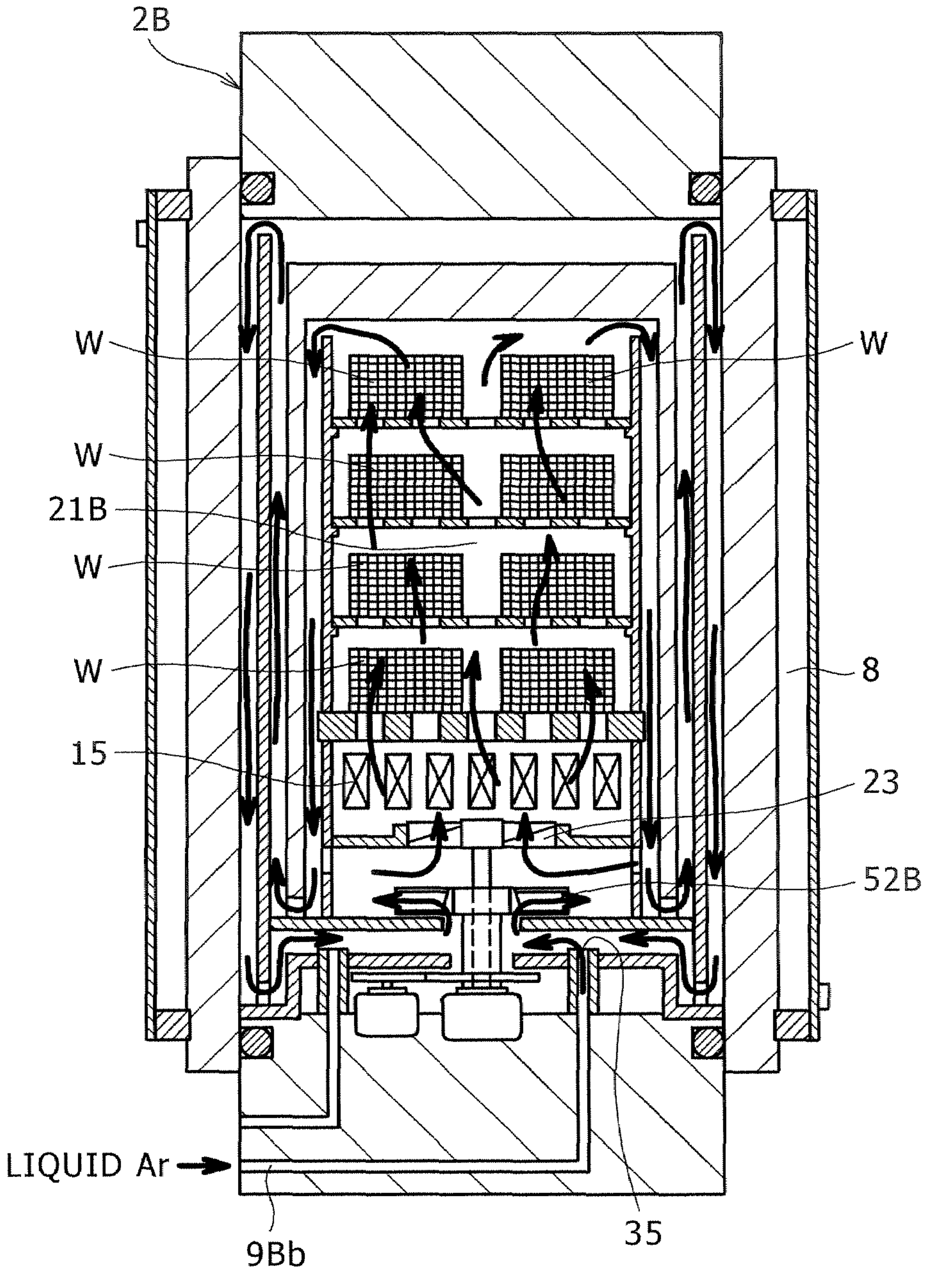
FIG. 14 is a diagram showing the motion of argon within the high pressure vessel in HIP treatment.

When the temperature in the treatment chamber 21 becomes 300° or so, then with only the removal of heat by the inner surface of the pressure-resisting cylinder 4 whose temperature has become 100° C. or so by water-cooling, the cooling speed decreases to the extreme degree. Therefore, as shown in FIG. 14, liquid argon is injected from the liquid argon inlet port 35 into the high pressure vessel 2B to promote cooling of the workpieces W (#19).

The injected liquid argon evaporates in the interior of the high pressure vessel 2B. At this time, the resulting argon gas deprives of latent heat from the surroundings and drops in temperature. The argon gas thus reduced in temperature is fed into the treatment chamber 21B by the cooling fan 52B and the fan 23 and cools the workpieces W efficiently. The liquid argon inlet port 35 is open to the suction side of the cooling fan 52B and the fan 23 and the argon gas low in temperature is fed directly into the treatment chamber 21B.

By thus vaporizing the liquid argon and cooling the interior of the treatment chamber 21B with use of the heat of vaporization, it is possible to greatly shorten the time required for cooling from about 300° C. to about 100° C.

The final stage of cooling is performed by discharging the argon gas of a high pressure present within the high pressure vessel 2B to the exterior (#20). As a result of discharge of the high pressure argon gas, the argon gas present within the high pressure vessel 2B expands rapidly in an adiabatic state and drops in temperature. By the effect of cooling based on such an adiabatic expansion, when the pressure drops to near the atmospheric pressure, the temperature of the workpieces W can be lowered to the temperature permitting taking-out of the workpieces (#21). The discharge of the high pressure argon gas is effective in cooling the workpieces W.

Thus, by discharge of the high pressure argon gas present within the high pressure vessel 2B, it is possible to greatly shorten the time required for cooling the workpieces W.

Figure 16B:
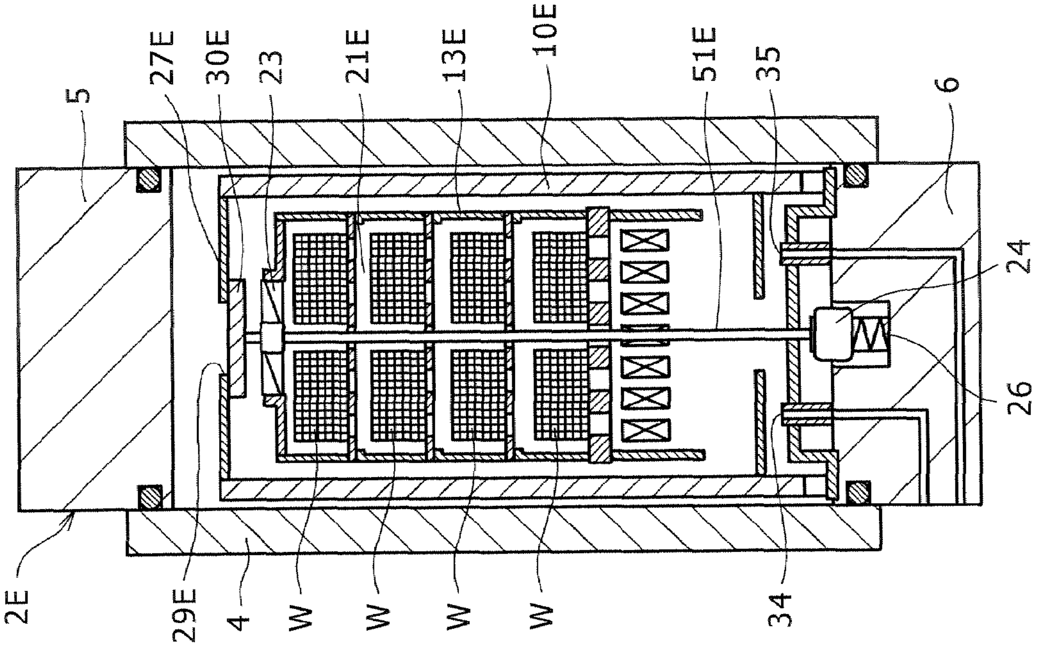
FIG. 16 is a sectional front view of a high pressure vessel in a further embodiment of the present invention.
Figure 16A:
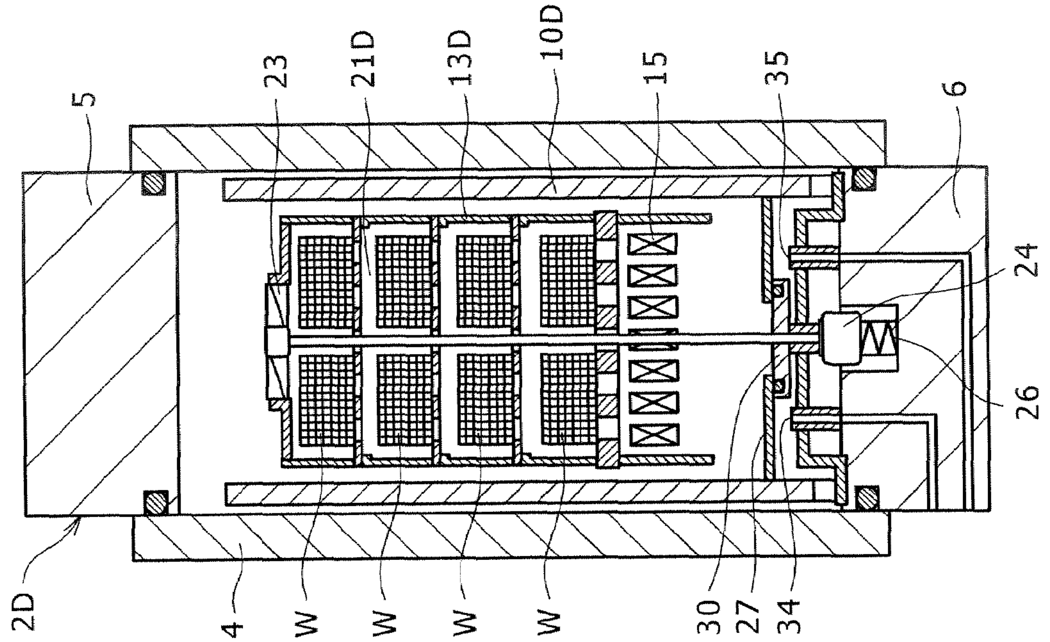
Figure 17B:
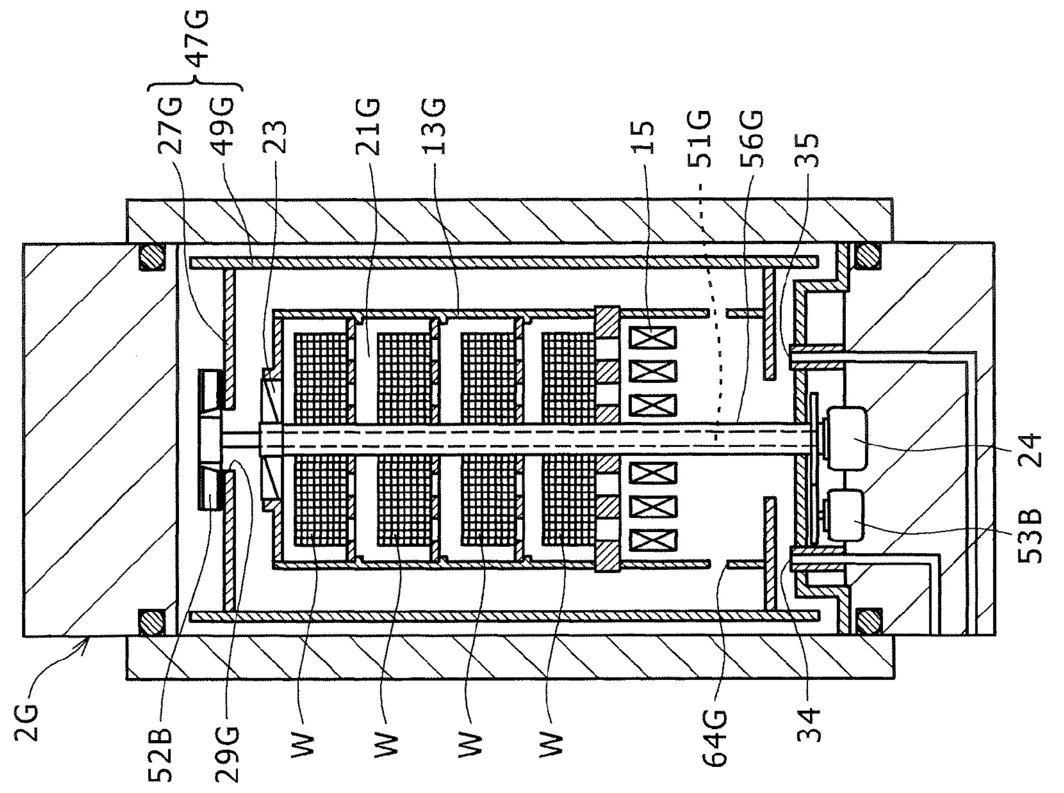
FIG. 17 is a sectional front view of a high pressure vessel in a still further embodiment of the present invention.
Figure 17A:
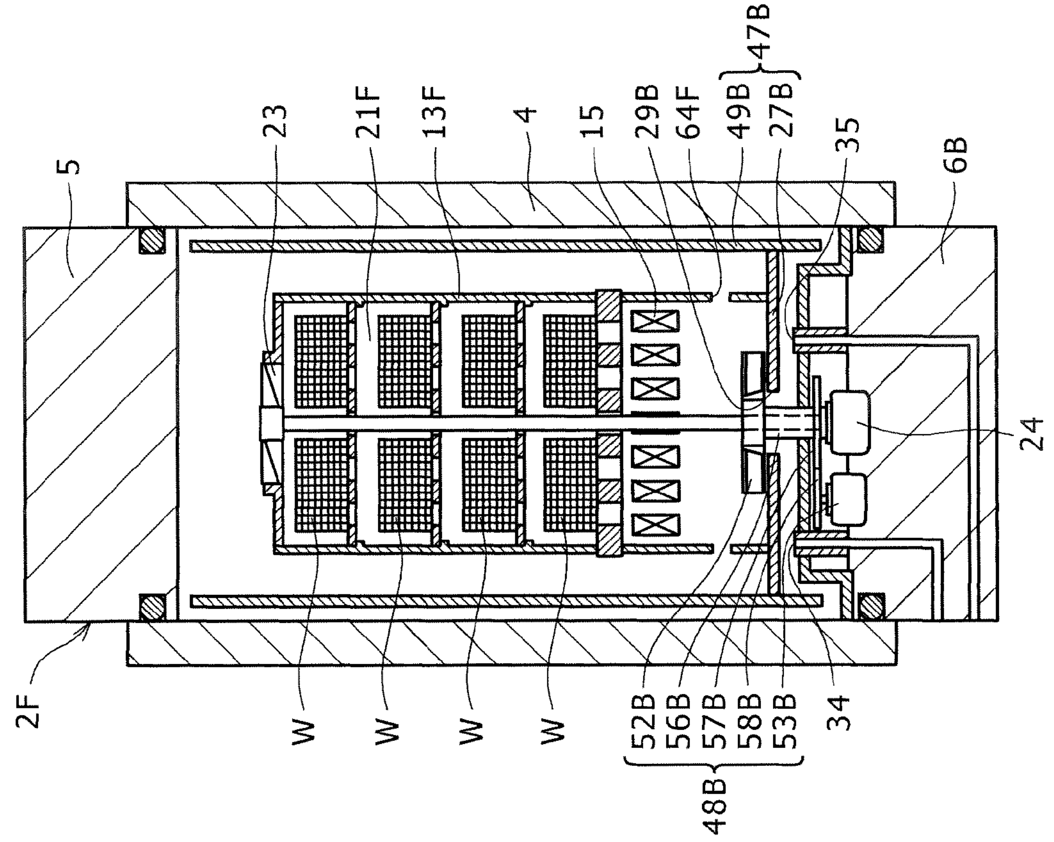
Figure 18:
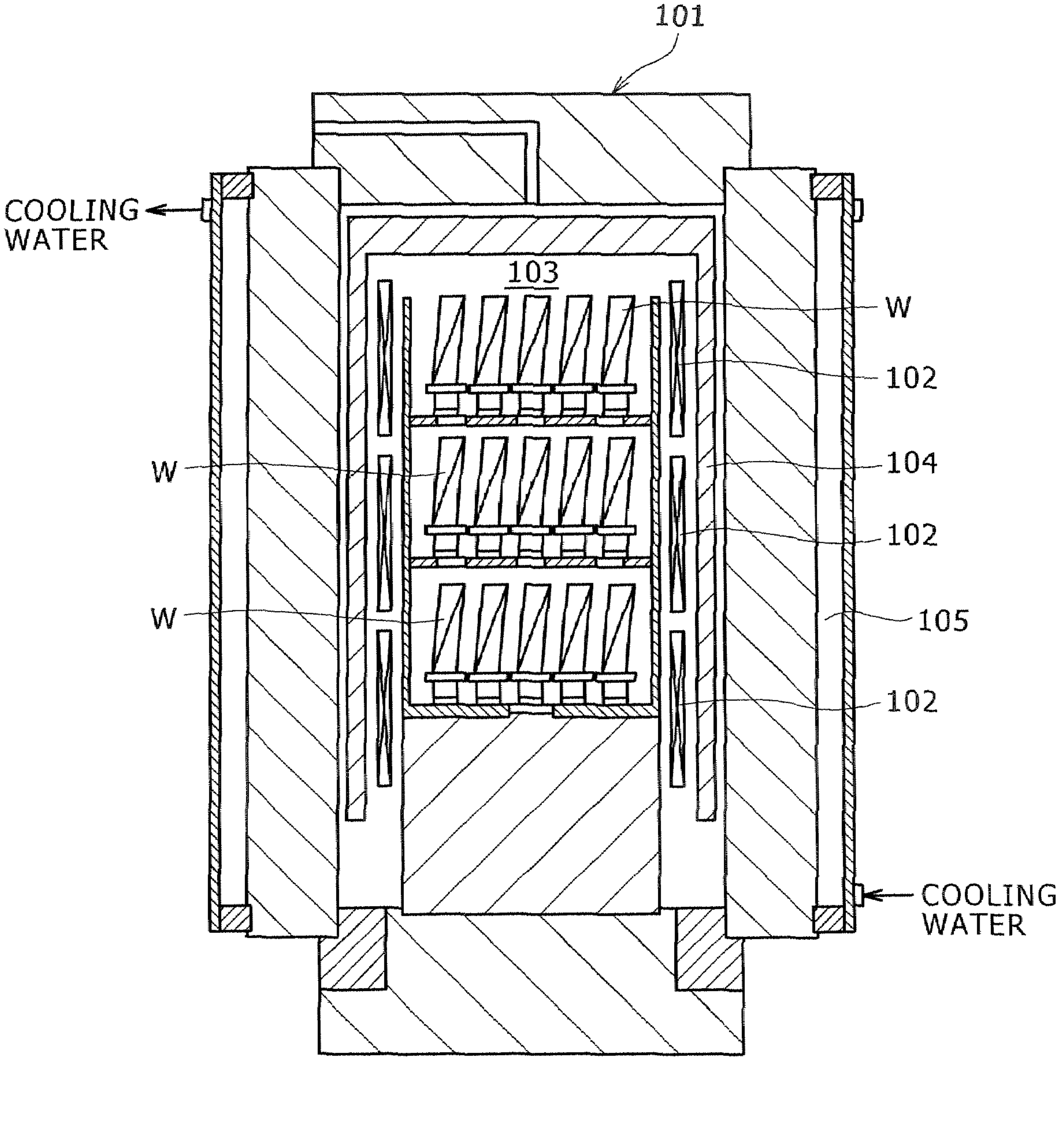
FIG. 18 is a sectional front view of a conventional high pressure vessel.

The high pressure vessel 2 can be constructed as shown in FIG. 16 or FIG. 17.

In a high pressure vessel 2D shown in FIG. 16(*a*), a lower end of a flow uniforming cylinder 13D is open and a fan 23 for ventilating a treatment chamber 21D is provided at an upper end of the flow uniforming cylinder 13D. The flow uniforming cylinder 13D is received within a structure body 10D in a state in which a gap is formed between an outer surface of the flow uniforming cylinder 13D and an inner surface of the structure body 10D. Although a lid is not provided at an upper end of the structure body 10D, an upper lid corresponding to the upper lid 11 in the high pressure vessel 2 may be provided and plural upper gas passages may be formed therein for communication between the interior and the exterior of the structure body 10D.

In a high pressure vessel 2E shown in FIG. 16(*b*), like the high pressure vessel 2D, a lower end of a flow uniforming cylinder 13E is open and a fan 23 for ventilating a treatment chamber 21E is provided at an upper end of the flow uniforming cylinder 13E. A cooling control valve of about the same configuration as the cooling control valve 17 in the high pressure vessel 2 is provided at an upper end of a structure body 10E. In the cooling control valve, a thick disc-like valve body portion 30E is fixed to a driving shaft 51E and rotates together with the fan 23. When the valve body portion 30E performs a closing motion, it does not come into abutment against the vicinity of the edge of a hole 29E formed in an upper plate 27E, but leaves a slight gap against the upper plate 27E. In the valve closing operation, however, it is possible to obtain a practical closed state in HIP treatment.

In FIG. 16, the portions identified by the same reference numerals as in the high pressure vessel (FIG. 2) are of the same configurations as in the high pressure vessel 2. The operations of the fan 23 and the cooling control valve in the high pressure vessels 2D and 2E are the same as the operations in HIP treatment of the fan 23 and the cooling control valve 17 both used in the high pressure vessel 2.

In a high pressure vessel 2F shown in FIG. 17(*a*), a flow uniforming cylinder 13F is provided in a lower portion thereof with passages 64F for communication between the interior and the exterior of the flow uniforming cylinder 13F and is provided at an upper end thereof with a fan 23 for ventilating a treatment chamber 21F. The flow uniforming cylinder 13F is received within an isolation cylinder 47B in a state in which a gap is formed between an outer surface of the flow uniforming cylinder and an inner surface of a cylindrical portion 49B of the isolation cylinder 47B. A cooling fan 52B is provided over a hole of a bottom plate 27.

In a high pressure vessel 2G shown in FIG. 17(*b*), a flow uniforming cylinder 13G is provided in a lower portion thereof with passages 64G for communication between the interior and the exterior of the flow uniforming cylinder 13G and is provided at an upper end thereof with a fan 23 for ventilating a treatment chamber 21G. The flow uniforming cylinder 13G is received within an isolation cylinder 47G in a state in which a gap is formed between an outer surface of the flow uniforming cylinder and an inner surface of a cylindrical portion 49G of the isolation cylinder 47G. An upper plate 27G closes an upper end of the isolation cylinder 47G and a circular hole 29G is formed at the center of the upper plate 27G, with a cooling fan 52B being provided over the hole 29G.

In FIG. 17, the portions identified by the same reference numerals as in the high pressure vessel 2B (FIG. 9) are of the same configurations as in the high pressure vessel 2. Further, the operations of the fan 23 and cooling fan 52B in the high pressure vessel 2F and 2G during HIP treatment are the same as those of the fan 23 and cooling fan 52B in the high pressure vessel 2B during HIP treatment.

In the HIP treatment using the hot isostatic pressing apparatus 1 equipped with the high pressure vessel 2 or 2B, (1) the problem that the cycle time is long, especially the cooling time in the temperature region of 300° C. or lower is long, and (2) the problem that there occurs a temperature distribution (temperature difference) in upper and lower portions within the treatment chamber in the course of cooling, are solved and it becomes possible to take out the workpieces W from the HIP apparatus after a short cooling time and hence possible to shorten the cycle time in the HIP apparatus.

Recent HIP apparatus for production are becoming larger in size, 1 m or more in terms of the diameter of the treatment chamber, from the standpoint of reducing the treatment cost by a scale-up effect, while the increase of cost due to a longer treatment time attributable to the increase in size is posing a problem. In such a large-sized HIP apparatus, even if the HIP treatment is over, the workpieces cannot be transferred to the next step unless the temperature drops to about 50° C. or lower. Thus, there exists the problem that the effect of cost-down (scale merit) resulting from the increase of size is not actually exhibited.

Further, the size of workpieces has recently been becoming more and more large and it is presumed that such an ultra-large-sized HIP apparatus as is 2 m in terms of the diameter of a treatment chamber will be put to practical use in the near future. However, for practical application of such an HIP apparatus it is absolutely necessary to solve the foregoing problems. The hot isostatic pressing apparatus 1 equipped with the high pressure vessel 2 (2B) solves those problems and makes a great contribution to the spread of such ultra-large-sized HIP apparatus and hence to the development of the industry.

In the above embodiments the cryogenic pump 43 may be replaced by another means for increasing the pressure of liquid gas. As the gas or liquefied gas to be pressurized there may be used nitrogen gas (liquefied nitrogen) or helium gas (liquefied helium).

The hot isostatic pressing apparatus, the configurations of the components thereof, the entire configuration of the apparatus, as well as the shape, size, number of components and material, may be changed as necessary.

The high temperature, high pressure treatment to which the present invention is applicable is performed at a temperature of 300° to 2000° C., preferably 1000° to 1500° C., and a pressure of 10 to 300 MPa, preferably 30 to 150 MPa.

The invention claimed is:

1. A hot isostatic pressing method comprising the steps of:
accommodating a workpiece in the interior of a high pressure vessel;
filling the interior of said high pressure vessel with gas;
maintaining the interior of said high pressure vessel at a high temperature and a high pressure for a predetermined time to treat said workpiece; and
after the completion of said step of maintaining the interior of said high pressure vessel at a high temperature and a high pressure for a predetermined time to treat said workpiece, cooling said workpiece with reduction in the pressure in the interior of said high pressure vessel,
wherein said step of cooling said workpiece with reduction in the pressure in the interior of said high pressure vessel includes a step of supplying liquefied gas in liquid form into said high pressure vessel at a time when the pressure in the interior of said high pressure vessel is less than said high pressure and the temperature of the interior of said high pressure vessel is less than said high temperature and greater than room temperature, wherein the liquefied gas is a gas at near room temperature and pressure, whereby the workpiece is cooled by the heat of vaporization of the liquefied gas supplied in liquid form.

2. The hot isostatic pressing method according to claim 1, wherein said gas is an inert gas.

3. The hot isostatic pressing method according to claim 1, wherein said gas and said liquefied gas in liquid form are the same substance.

4. The hot isostatic pressing method according to claim 1, comprising a further cooling step, performed before the step of supplying liquefied gas in liquid form into said high pressure vessel, of cooling the workpiece without supplying said liquefied gas in liquid form into said high pressure vessel.

5. The hot isostatic pressing method according to claim 1, wherein, in said cooling step, a fan provided in the interior of said high pressure vessel is rotated to agitate the gas present within said high pressure vessel.

6. The hot isostatic pressing method according to claim 1, wherein the supply of said liquefied gas in liquid form into said high pressure vessel is performed using a cryogenic pump.

7. The hot isostatic pressing method according to claim 1, wherein said liquefied gas in liquid form is Argon.

8. The hot isostatic pressing method according to claim 1, wherein said step of supplying liquefied gas in liquid form into said high pressure vessel is performed when the temperature of the interior of said high pressure vessel is about 300° C.

9. The hot isostatic pressing method according to claim 1, comprising a further cooling step, performed after the step of supplying liquefied gas in liquid form into said high pressure vessel, of discharging gas in the vessel at a pressure of about 35-45 MPa to the atmosphere, thereby further cooling the workpiece in the high pressure vessel by adiabatic expansion.

* * * * *